(12) United States Patent
Dent

(10) Patent No.: US 7,689,639 B2
(45) Date of Patent: Mar. 30, 2010

(54) COMPLEX LOGARITHMIC ALU

(75) Inventor: Paul Wilkinson Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1310 days.

(21) Appl. No.: 11/142,760

(22) Filed: Jun. 1, 2005

(65) Prior Publication Data

US 2005/0273483 A1  Dec. 8, 2005

Related U.S. Application Data

(60) Provisional application No. 60/577,386, filed on Jun. 4, 2004.

(51) Int. Cl.
*G06F 15/00* (2006.01)
*G06F 7/38* (2006.01)

(52) U.S. Cl. ................................ 708/517; 708/511

(58) Field of Classification Search ............... 708/512, 708/517
See application file for complete search history.

(56) References Cited

U.S. PATENT DOCUMENTS

| 4,433,604 | A | * | 2/1984 | Ott .............................. 84/603 |
| 4,747,067 | A | * | 5/1988 | Jagodnik et al. ............ 708/517 |
| 5,048,059 | A | | 9/1991 | Dent |
| 5,070,303 | A | | 12/1991 | Dent |
| 5,148,373 | A | | 9/1992 | Dent |
| 5,914,990 | A | * | 6/1999 | Soderkvist ................... 375/350 |
| 5,944,774 | A | | 8/1999 | Dent |
| 6,711,596 | B1 | | 3/2004 | Coleman |
| 7,284,027 | B2 | * | 10/2007 | Jennings et al. ............. 708/622 |

OTHER PUBLICATIONS

Coleman, J.N. et al., "Arithmetic on the European Logarithmic Microprocessor," IEEE Transactions on Computers, Jul. 2000, pp. 702-715, vol. 49, No. 7.
Lewis, David, "Interleaved Memory Function Interpolators with Application to an Accurate LNS Arithmetic Unit," IEEE Transactions on Computers, Aug. 1994, pp. 974-982, vol. 43, No. 8.
Lewis, David, "An Architecture for Addition and Subtraction of Long Word Length Numbers in the Logarithmic Number System," IEEE Transactions on Computers, Nov. 1990, pp. 1325-1336, vol. 39, No. 11.

(Continued)

*Primary Examiner*—Chuong D Ngo
(74) *Attorney, Agent, or Firm*—Coats & Bennett, PLLC

(57) ABSTRACT

The present invention describes a method and apparatus for performing logarithmic arithmetic with real and/or complex numbers represented in a logarithmic format. In one exemplary embodiment, an ALU implements logarithmic arithmetic on complex numbers represented in a logpolar format. According to this embodiment, memory in the ALU stores a look-up table used to determine logarithms of complex numbers, while a processor in the ALU generates an output logarithm based on complex input operands represented in logpolar format using the stored look-up table. In another exemplary embodiment, the ALU performs logarithmic arithmetic on real and complex numbers represented in logarithmic format. In this embodiment, the memory stores two look-up tables, one for determining logarithms of real numbers and one for determining logarithms of complex numbers, while the processor generates an output logarithm based on real or complex input operands represented in logarithmic format using the real or complex look-up tables, respectively.

46 Claims, 11 Drawing Sheets

OTHER PUBLICATIONS

Kingsbury, N.G. et al., "Digital Filtering Using Logarithmic Arithmetic," Electronic Letters, Jan. 28, 1971, vol. 7, No. 1.

Arnold M G et al Institute of Electrical and Electronics Engineers, "Arithmetic Co-transformations in the Real and Complex Logarithmic Number Systems," Proceedings 13$^{th}$ IEEE Symposium on Computer Arithmetic, Jul. 6-9, 1997, pp. 190-199, XP010241209.

Arnold M et al, "Fast Fourier Transforms Using the Complex Logarithmic Number System," Journal of VLSI Signal Processing Systems for Signal, Image, and Video Technology, Mar. 2003, pp. 325-335, vol. 33, No. 3, Kluwer Academic Publishers, Dordrecht, NL, XP001159410.

Yan Wang et al, "Low Complexity OFDM Receiver Using Log-FFT for Coded OFDM System," 2002 IEEE International Symposium on Circuits and Systems, 2002, pp. 445-448, vol. 3, IEEE Piscataway, NJ, XP002348180.

Chichyang Chen et al, "Pipelined Computation of LNS Addition/ Substraction with Very Small Lookup Tables," Computer Design: VLSI in Computers and Processors, Oct. 5, 1998, pp. 292-297, XP010310302.

* cited by examiner

| SIGN BIT | 8-BIT EXPONENT POWER OF 2 OFFSET BY +127 | 23-BIT MANTISSA WITH LEADING "1." IMPLIED AND OMITTED |
|---|---|---|

VALUE RANGE
∓2^+129 TO 2^-127
6.81e38 TO 5.87e-39
(+776dBs TO -746dBs)

IEEE FORMAT: THE NUMBER EQUALS $2^{exponent-127} \times SIGN \times (1.MANTISSA)$

[ THE SUPPRESSED LEADING 1 IS NOT ADDED BACK IF THE WORD IS 32 ZEROS THEREBY "FAKING" A TRUE ZERO ]

| SIGN BIT | 7-BIT EXPONENT POWER OF e OFFSET BY +64 | 24-BIT MANTISSA = FRACTIONAL PART OF $LOG_e$ OF THE VALUE |
|---|---|---|

VALUE RANGE
∓e^+64 TO e^+64
(+556dBs TO -556dBs)

LOG TO THE BASE e: THE NUMBER EQUALS $SIGN \times e^{exponent.mantissa-63}$

| SIGN BIT | 8-BIT EXPONENT POWER OF 2 OFFSET BY +127 | 23-BIT MANTISSA = FRACTIONAL PART OF $LOG_2$ OF THE VALUE |
|---|---|---|

VALUE RANGE
∓2^+129 TO 2^-127
(+776dBs TO -746dBs)

BASE 2 LOG FORMAT: THE NUMBER EQUALS $SIGN \times 2^{exponent.mantissa-127}$
THE ALL ZEROS PATTERN CAN BE DEFINED TO BE A "FAKE ZERO" IF DESIRED

*FIG. 2*

COMPLEX LOGARITHMIC ALU

RELATED APPLICATIONS

This application claims priority to Provisional U.S. Patent Application 60/577,386 filed Jun. 4, 2004, which is incorporated herein by reference.

BACKGROUND OF THE INVENTION

The present invention relates generally to computing and digital signal processing, and more particularly to pipelined logarithmic arithmetic in an arithmetic logic unit (ALU).

ALUs have traditionally been used to implement various arithmetic functions, such as addition, subtraction, multiplication, division, etc., on real and/or complex numbers. Conventional systems use either fixed-point or floating-point number ALUs. ALUs using real logarithmic of limited precision are also known. For example, see "Digital filtering using logarithmic arithmetic" (N. G. Kingsbury and P. J. W. Rayner, Electron. Lett. (Jan. 28, 1971), Vol. 7, No. 2, pp. 56-58). "Arithmetic on the European Logarithmic Microprocessor" (J. N. Coleman, E. I. Chester, C. I. Softley and J. Kadlec, (July 2000) IEEE Trans. Comput., Vol. 49, No. 7, pp. 702-715) provides another example of a high precision (32-bit) logarithmetic unit for real numbers.

Fixed-point programming presents the programmer with the onus of mentally keeping track of the location of the decimal point, particularly after multiplication or division operations. For example, suppose an FIR filter involves weighted addition of signal samples using weighting factors of −0.607, 1.035, −0.607 . . . , which must be specified to 1 part in 1000 accuracy. In fixed-point arithmetic, it is necessary to represent 1.035 by 1035, for example. As a result, multiplication of a signal sample by this number expands the wordlength of the result by 10 bits. It order to store the result in the same memory wordlength, it is then necessary to discard 10 bits; however, whether it is the MSBs (most significant bits) or LSBs (least significant bits) or some of each that shall be discarded depends on the signal data spectrum, and so must be determined by simulation using realistic data. This makes verification of correct programming laborious.

Floating-point processors were introduced to circumvent the inconvenience of mentally keeping track of the point by automatically keeping track of the point with the aid of an "exponent" part associated with the "mantissa" part of each stored number. The IEEE standard floating-point format is:

SEEEEEEEE.MMMMMMMMMMMMMMMMMMMMMMM, where S is the sign of the value (0=+; 1=−), EEEEEEEE is the 8-bit exponent, and MMM...MM is the 23-bit mantissa. With the IEEE standard floating-point format, the 24th most significant bit of the mantissa is always 1 (except for true zero), and therefore omitted. In the IEEE format, the actual value of the mantissa is thus:

1.MMMMMMMMMMMMMMMMMMMMMMM.

For example, the base-2 logarithmic number $-1.40625 \times 10^{-2} = -1.8 \times 2^{-7}$ may be represented by the IEEE standard format as:

1 01111000.11001100110011001100110.

Further, the zero exponent is 01111111, and thus the number +1.0 may be written as:

0 01111111.00000000000000000000000.

Representing true zero would require a negatively infinite exponent, which is not practical, so an artificial zero is created by interpreting the all zeros bit pattern to be true zero instead of $2^{-127}$.

To multiply two floating-point numbers, the mantissas with their suppressed MSB 1's replaced, are multiplied using a fixed-point 24×24-bit multiplier, which is logic of moderately high complexity and delay, while the exponents are added and one of the offsets of 127 subtracted. The 48-bit result of multiplication must then be truncated to 24 bits and the most significant 1 deleted after left-justification. Multiplication is thus even more complicated for floating-point than for fixed-point numbers.

To add two floating-point numbers, their exponents must first be subtracted to see if their points are aligned. If the points are not aligned, the smaller number is selected to be right-shifted a number of binary places equal to the exponent difference to align the points before adding the mantissas, with their implied 1's replaced. To perform the shifting fast, a barrel shifter may be used, which is similar in structure and complexity to a fixed-point multiplier. After adding and more particularly subtracting, leading zeros must be left-shifted out of the mantissa while incrementing the exponent. Thus addition and subtraction are also complicated operations in floating-point arithmetic.

In purely linear format, additions and subtractions with fixed-point numbers are simple, while multiplications, divisions, squares, and square roots are more complicated. Multipliers are constructed as a sequence of "shift and conditionally add" circuits that have inherently a large number of logic delays. Fast processors may use pipelining to overcome this delay, but this typically complicates programming. It is therefore of interest to minimize the pipelining delay in a fast processor.

It should be noted that the floating-point number representation is a hybrid between logarithmic and linear representation. The exponent is the whole part of log to the base-2 of the number, while the mantissa is a linear fractional part. Because multiplication is complicated for linear representations and adds are complicated for logarithmic representations, this explains why both are complicated for the hybrid floating-point representations. To overcome this, some known systems, such as those cited above, have used a purely logarithmic representation. This solves the problem of keeping track of the point and simplifies multiplication, leaving only addition complicated. The logarithmic additions were performed in the prior art using look-up tables. However, limitations on the size of the tables restricted this solution to limited word length, for example to the 0-24 bit range. In the above reference to Coleman, 32-bit precision was achieved with reasonably sized look-up tables using an interpolation technique that requires a multiplier. As such, the Coleman process still includes the complexities associated with multiplication.

While the prior art describes various methods and apparatus for implementing real logarithmic arithmetic, the prior art does not provide a look-up table solution for complex arithmetic, which would be useful in radio signal processing. Further, the prior art does not provide an ALU having shared real and complex processing capabilities. Because radio signal processing often requires both complex and real processing capabilities, a single ALU that implements both real and complex logarithmic arithmetic would be beneficial in wireless communication devices having size and/our power concerns.

SUMMARY OF THE INVENTION

The present invention relates to an arithmetic logic unit (ALU) that performs arithmetic computations with real and/or complex numbers represented in a logarithmic format. Using a logarithmic number representation simplifies multiplication and division operations, but makes addition and subtraction more difficult. However, the logarithm of the sum or difference of two input operands may be simplified using known algorithms, as discussed herein. In the following discussion, it is assumed that a>b and that c=a+b. It can be shown that:

$$C=\log_q(c)=\log_q(a+b)=A+\log_q(1+q^{-r}), \quad (1)$$

where q is the base of the logarithm, r=A−B, A=$\log_q$(a), and B=$\log_q$(b). The operation represented by Eq. (1), referred to herein as logadd, allows the log of the sum of a and b to be computed using only addition and subtraction operations, where the value of $\log_q(1+q^{-r})$ is determined using a look-up table.

In one exemplary embodiment, the present invention provides an ALU for performing logarithmic operations on complex input operands represented in a logpolar format. For example, A=$\log_q$(a)=($R_1,\theta_1$) and B=$\log_q$(b)=($R_2, \theta_2$), where R and $\theta$ represent a logmagnitude and a phase angle, respectively, as discussed further below. According to this embodiment, the ALU includes memory and a processor. The memory stores a look-up table used to determine logarithms of complex numbers in the logpolar format, while the processor generates an output logarithm of complex input operands represented in logpolar format using the stored look-up table.

In another exemplary embodiment, the present invention provides an ALU for performing logarithmic operations on both real and complex numbers represented in a logarithmic format. An exemplary ALU according to this embodiment also comprises memory and a processor. The memory stores two look-up tables, one for determining logarithms of real numbers and one for determining logarithms of complex numbers. The processor comprises a shared processor that generates an output logarithm based on input operands represented in a logarithmic format using the real look-up table for real input operands and the complex look-up table for complex input operands.

In any event, according to one exemplary embodiment of the present invention, the processor may comprise a butterfly circuit configured to simultaneously generate an output logarithm for both logadd and logsub operations. According to another exemplary embodiment, the processor may comprise a look-up controller and an output accumulator, where the look-up controller computes one or more partial outputs based on the look-up table(s). The partial outputs may be determined during one or more iterations, or may be determined during one or more stages of a pipeline. The output accumulator generates the output logarithm based on the partial outputs.

BRIEF DESCRIPTION OF THE DRAWINGS

FIG. 2 illustrates a chart comparison between IEEE floating-point format and true logarithmic format for real numbers.

DETAILED DESCRIPTION OF THE INVENTION

Figure 1:
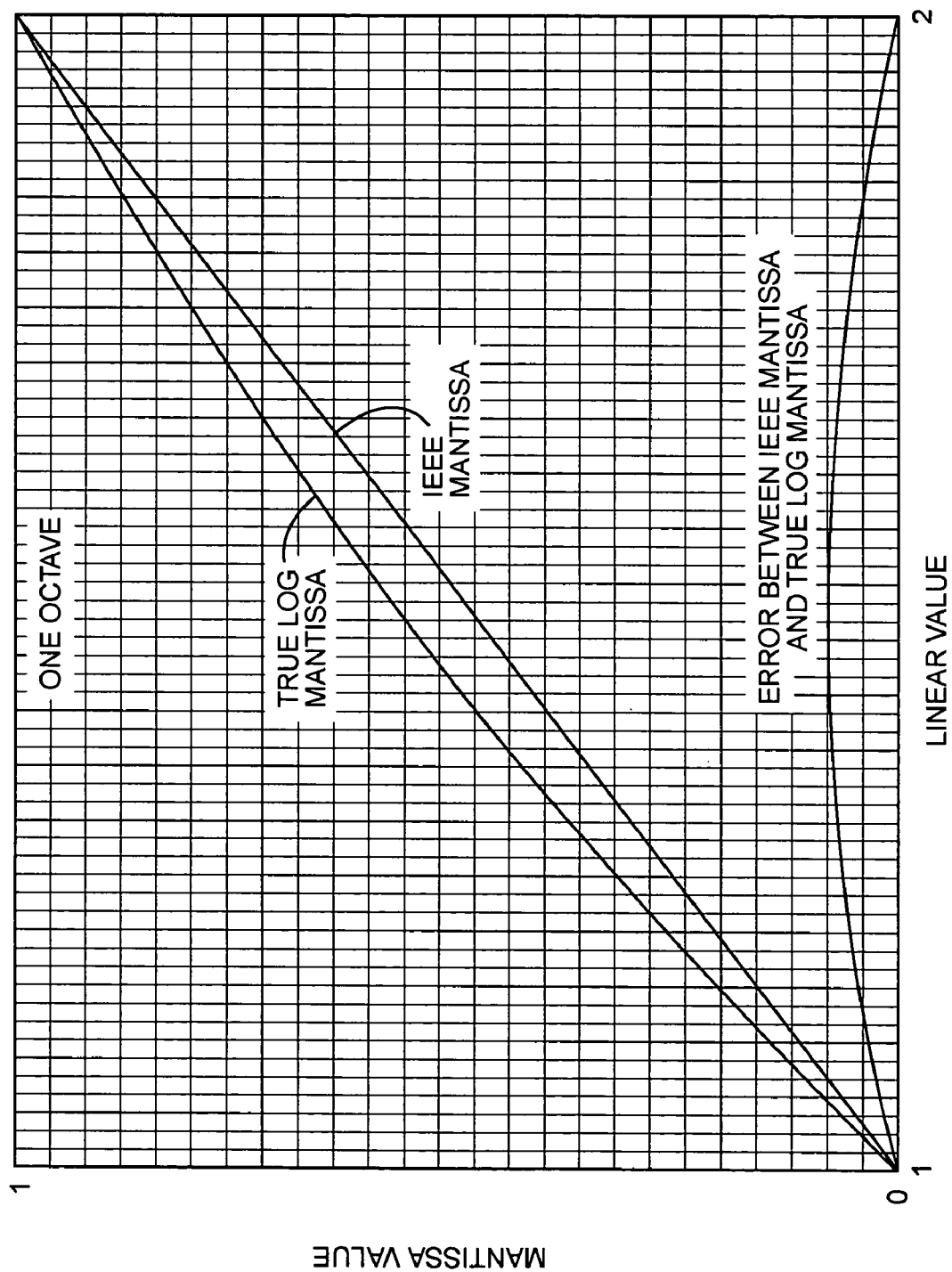
FIG. 1 illustrates a plot comparison between IEEE floating-point format and true logarithmic format for real numbers.

The present invention provides an ALU for performing logarithmic arithmetic on complex and/or real numbers in a logarithmic format. In one embodiment, the ALU performs logarithmic arithmetic on complex numbers represented in a logpolar format using one or more look-up tables. In another embodiment, the ALU performs logarithmic arithmetic on both complex and real numbers represented in a logarithmic format using at least one complex and one real look-up table, respectively. To better understand the details and benefits of the invention, the following first provides details regarding number representation, conventional interpolation, iterative logarithmic operations, high precision iterative logarithmic addition, high precision iterative logarithmic subtraction, and exponential approximation.

Number Representation

Logarithmic operations implemented in an ALU generally require a specific number format. As discussed above, conventional processors may format real or complex numbers in a fixed-point binary format or a floating-point format. As discussed above, the fixed point format is a purely linear format. Therefore, additions and subtractions with fixed-point numbers are simple, while multiplications are more complicated. Floating-point numbers are a hybrid between logarithmic and linear representations. Therefore, addition, subtraction, multiplication, and division are all complicated in floating-point format. To overcome some of the difficulties associated with these formats, a purely logarithmic format may be used with an appropriate algorithm to solve the addition and subtraction problem associated with the logarithmic format. The following provides additional details associated with the purely logarithmic format as it may apply to the present invention.

Real numbers in a purely logarithmic format may be abbreviated as (S 8.23) and represented as:

S xxxxxxxx.xxxxxxxxxxxxxxxxxxxxxxx.

Two such real numbers may be used as one way to represent complex numbers. However, as described further below, a logpolar format may be a more advantageous way to represent complex numbers.

The base used for the logarithms is open to choice. However, there are advantages with choosing one base over another. Choosing base-2, for example, has a number of advantages. First, as shown in Equation (2), a 32-bit pure logarithmic format then looks substantially identical to the (S8.23) IEEE floating-point representation.

$$\text{Pure logarithmic: } S\,xx...xx.xx...xx \leftrightarrow (-1)^S \times 2^{xx...xx.xx...xx} \\ \text{IEEE: } S\,EE...EE.MM...MM \leftrightarrow (-1)^S \times (1+0.MM...MM) \times 2^{-EE...EE} \quad (2)$$

The whole part of log to the base-2 may be offset by 127 as in the IEEE format so that the number 1.0 is represented in either format by:

0 01111111.00000000000000000000000.

Alternatively, an offset of 128 could be used, in which case 1.0 is represented by:

0 10000000.00000000000000000000000.

Using 127 or 128 as the preferred offset is a matter of implementation.

The all zeros pattern may be defined as an artificial true zero, as in the IEEE floating-point format. In fact, if the same exponent offset (127) is used, such a pure logarithmic format coincides with the IEEE format for all numbers that are a power of two, e.g., 4, 2, 1, 0.5, etc., and the mantissa part of each differs only slightly in between powers of two, as shown in FIG. 1.

With the purely logarithmic format, the maximum representable value is:

0 11111111.11111111111111111111111, which for base-2 represents a logarithm of almost 256 minus the offset of 127, i.e., a number of almost $2^{129}$ or $6.81 \times 10^{38}$.

The smallest representable value is:

0 00000000.00000000000000000000000 which for base-2 represents a logarithm equal to −127, which is $5.88 \times 10^{-39}$. If desired, this all-zeros format may, as in the IEEE case, be reserved to represent an artificial true zero. In this scenario, the smallest representable number is:

0 00000000.00000000000000000000001, which is a base-2 logarithm equal to almost −127, which still corresponds to approximately $5.88 \times 10^{-39}$.

The quantization accuracy of the IEEE mantissa, which has a value between 1 and 2, is the LSB value of $2^{-23}$, an accuracy of between $2^{-23}$ and $2^{-24}$ (0.6 to $1.2 \times 10^{-7}$). The accuracy of representing a number x in base-2 log format is a constant $2^{-23}$ in the logarithm, which gives $dx/x = \log_e(2) \times 2^{-23}$ or $0.83 \times 10^{-7}$, which is slightly better than the average of the IEEE quantization accuracy.

In another implementation, logarithms to other bases, such as base-e, may be used. For base-e, real numbers may then be stored in 32-bit sign plus logmagnitude format denoted by:

S xxxxxxx.xxxxxxxxxxxxxxxxxxxxxxxx, or (S7.24) for short. Due to the larger base (e=2.718), a smaller number of bits to the left of the point suffices to give an adequate dynamic range, while an extra bit to the right of the point is needed for equivalent or better precision, as discussed further below.

The logmagnitude part may be a signed, fixed-point quantity wherein the leftmost bit is the sign bit, not to be confused with the sign S of the represented number. Alternatively, the logmagnitude part may be offset by +64 (or +63) so that the bit pattern:

0 1000000.00000000000000000000000 represents a zero log (number=1.0). In the latter case, the largest representable number has the base-e log:

0 1111111.11111111111111111111111, which is almost 128, less the offset of 64, i.e., $e^{64}$ or $6.24 \times 10^{27}$, while the reciprocal represents the smallest representable number. Equation (3) represents the quantization accuracy of the base-e log representation.

$$ds/x = 2^{-24} = 0.6 \times 10^{-7} \quad (3)$$

FIG. 2 compares the IEEE Floating-point Format (with +127 offset) with the base-e format (with +64 offset) and the base-2 format (with +127 offset).

Choosing the base is in fact equivalent to determining a trade-off between dynamic range and precision within the fixed word length, and is equivalent to moving the point in steps of less than one whole bit. Choosing bases of 2 or 4 or $\sqrt{2}$ (in general $2^{\pm 2^N}$, where N is a positive or negative integer) is equivalent to moving the point plus or minus N bit positions while giving the identical performance. Choosing a base of 8 however is not equivalent to moving the point a whole number of places, as it divides the log by 3. In other words, selecting the logarithm base is mathematically equivalent to changing the split of bits between the right and the left side of the binary point, which alters the compromise between accuracy and dynamic range. The point may, however, only be shifted in steps, while the base may be varied continuously. In the case of a signed logmagnitude, (as opposed to an unsigned, 127-offset logmagnitude) the sign bit is distinguished from the sign of the number (the S-bit) by referring to it as the sign of the logmagnitude. To clarify this further, consider that in base-10 logarithms, $\log_{10}(3) = 0.4771$, while $\log_{10}(\frac{1}{3}) = -0.4771$. Thus, to indicate a value of +3 in logarithmetic, the sign of both the number and its log is +, which may be written ++0.4771. The following table illustrates this notation.

| Notation | Representation |
| --- | --- |
| ++0.4771 | +3 in base-10 logarithmic |
| +−0.4771 | +⅓ in base-10 logarithmic |
| −+0.4771 | −3 in base-10 logarithmic |
| −−0.4771 | −⅓ in base-10 logarithmic |

To ensure all logarithmic representations are positive, an offset representation may be used. For example, if quantities were instead represented by the logarithm of how many times larger they were than a selected number, e.g., 0.0001, the representation of 3 would be $\log_{10}(3/0.0001) = 4.4771$ and the representation of ⅓ would be $\log_{10}(0.3333/0.0001) = 3.5229$. Due to the offset, both are now positive. The representation of 0.0001 would be $\log(0.0001/0.0001) = 0$. An all-zeros bit pattern then represents the smallest possible quantity of 0.0001.

Traditional log tables require storing 10,000 numbers for logs between 0.0000 and 0.9999 to look-up the antilogarithm, and a similar amount to obtain the logarithm to the same precision. Logarithmic identities may be used to reduce the size of look-up tables. For example, $\log_{10}(3) = 0.4771$ and $\log_{10}(2) = 0.3010$. From this it can be immediately deduced that:

$$\log_{10}(6) = \log_{10}(2 \times 3) = \log_{10}(3) + \log_{10}(2) = 0.4771 + 0.3010 = 0.7781.$$

It can also be immediately deduced that:

$$\log_{10}(1.5) = \log_{10}(3/2) = \log_{10}(3) - \log_{10}(2) = 0.4771 - 0.3010 = 0.1761.$$

It cannot, however, be immediately deduced that:

$$\log_{10}(5) = \log_{10}(2+3) = 0.6990$$

by any simple manipulation of the given numbers 0.4771 and 0.3010. Even less obvious is how $$\log_{10}(1) = \log_{10}(3-2) = 0$$

may be deduced from the logarithms of 3 and 2.

To address this problem, a look-up table based on a logadd function $F_a$ may be used. For example, the logarithm of (2+3) may be obtained by adding the larger of $\log_{10}(3)$ and $\log_{10}(2)$, that is 0.4771, to a function of their difference $F_a[\log_{10}(3) - \log_{10}(2)] = F_a(0.1761)$, where for base-10:

$$F_a(x) = \log_{10}(1 + 10^{-x}) \quad (4)$$

Similarly, the log of 3−2 may be obtained by subtracting a function $F_a(0.1761)$ from the larger of $\log_{10}(3)$ and $\log_{10}(2)$, where $F_s(x)$ for base-10 is:

$$F_s(x) = \log_{10}(1 - 10^{-x}) \quad (5)$$

However, a look-up table for $F_a(x)$ and $F_s(x)$ still requires storing at least 10,000 numbers for each function.

Interpolation Method

Interpolation may be used to reduce the number of values to be stored in the look-up table. To facilitate later discussions, the following examines interpolation in greater detail. Base-e is used for simplicity of illustration. However, it will be appreciated that other bases are equally applicable.

To compute the function $F_a(x)=\log_e(1+e^{-x})$ using a limited number of tabular values exemplified by $x_o$, a Taylor/Mc-Claurin expansion of the function $F(x)$ about the tabular point $x_o$ gives:

$$F(x)=F(x_o)+(x-x_o)F'(x_o)+0.5(x-x_o)^2 F''(x_o)\ldots, \quad (6)$$

where ' signifies the first derivative, " signifies the second derivative, etc. Based on this expansion, $\log_e(c)=\log_e(a+b)$ may be computed as $\log_e(a)+F_a(x)$ using the benefits of the Taylor McClaurin expansion, where $x=\log_e(a)-\log_e(b)$, and where values for $x_o$ are provided in a table.

To use simple linear interpolation for the 32-bit base-e case, the second order term involving the second derivative $F''$ must be negligible to the 24th binary place, e.g., less than $2^{-25}$. Differentiation of $F_a(x)=\log_e(1+e^{-x})$ yields:

$$F'_a(x) = \frac{-e^{-x}}{1+e^{-x}} \quad (7)$$

$$F''_a(x) = \frac{e^{-x}}{(1+e^{-x})^2}.$$

$F_a''(x)$ peaks at 0.25 when $x=0$. Thus, the second order term is less than $2^{-25}$ when $(x-x_o)<2^{-11}$. To meet this requirement, the most significant bits address the tabular points $x_o$ in the format (5.11), i.e., xxxxx.xxxxxxxxxxx, in order for the remainder $dx=x-x_o$ to be of the form:

0.00000000000xxxxxxxxxxxxx, and therefore less than $2^{-11}$. As such, dx is a 13-bit quantity and $x_o$ is a 16-bit quantity.

The accuracy of the linear interpolative term $F_a'(x_o)$ must also be of the order $2^{-25}$. Because $F_a'(x_o)$ is multiplied by dx, which is less than $2^{-11}$, the accuracy of $F_a'(x_o)$ must be $2^{-14}$. An extra couple of LSBs may be provided in the table for $F_a(x_o)$ to help reduce rounding errors, which suggests that a look-up table 5 bytes (40 bits) wide is required to store both F and F' for each $x_o$ value.

Therefore, the tabular values comprise $2^{16}=65,536$ values of 26-bit $F_a$ and the same number of corresponding 14-bit $F_a'$ values. In addition, a 14×13 bit multiplier is required to form $dx \cdot F_a'$. Such a multiplier inherently performs 13 shift-and-add operations, and thus includes approximately 13 logic delays. The complexity and delay of a multiplier may be reduced somewhat by using Booth's algorithm, however the conventional multiplier may be used as a benchmark.

Figure 3:
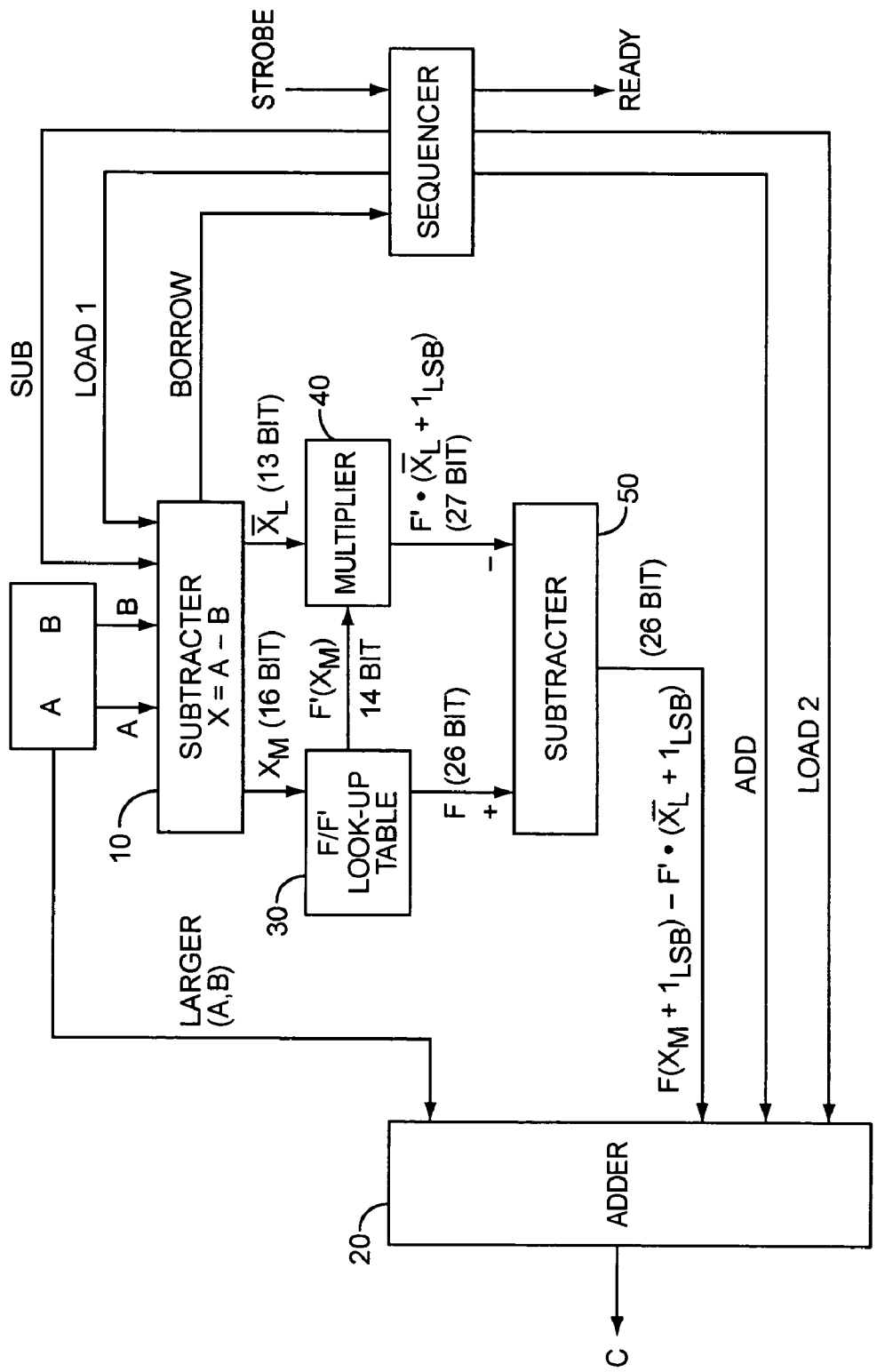
FIG. 3 illustrates a block diagram of a linear interpolator.

FIG. 3 illustrates an exemplary block diagram of a conventional ALU that implements the above-discussed linear interpolation. The ALU of FIG. 3 estimates the value $C=\log_e(A+B)$ using subtractor 10, adder 20, $F_a/F_a'$ look-up table 30, multiplier 40, and subtractor 50. As used in this example, $A=\log_e(a)$ and $B=\log_e(b)$. Because there may be a need to do backwards interpolation for subtraction to avoid singularity, as discussed below, FIG. 3 illustrates interpolation from $X_M$, a value of $x_o$ one more than the most significant 16 bit part of x. Look-up table 30 for $F_a$ contains the value of $F_a$ at $X_M+1$, therefore, and the value for $F_a'$ contained may be the value at the median of the interval, namely the value of $F_a'$ computed at $X_M+0.5$. Multiplier 40 multiplies the 14-bit $F_a'(X_M)$ value by the 13 bit two's complement of the least significant 13 bits of x, $\overline{X}_L$. Further, multiplier 40 is configured so that the result is the 27-bit product of $F_a'(X_M)$ and $(\overline{X}_L+1_{LSB})$.

The LSB of the 27-bit product may be input as the borrow to subtractor 50, and the remaining 26 bits subtracted from the 26-bit $F_a'(X_M)$value to yield the interpolated value to 26 bits, which is then added to the larger of A and B in output adder 20, rounding up the result C to 31 bits of logmagnitude by means of a carry-in bit of '1'.

A practical 32-bit logadder based on linear interpolation therefore comprises approximately 65,536×40=2.62 Mbits of look-up table 30 and a 13×14 bit multiplier 40. These components consume significant silicon area and have no speed advantage in terms of logic delays. However, in order to address subtraction or complex arithmetic operations using the interpolation method, substantial adjustment to word lengths and multiplier configuration are necessary.

For example, to implement subtraction using interpolation, function values are determined according to a subtraction function equation, given by:

$$F_s(x)=\log_e(1-e^{-x}). \quad (8)$$

The Taylor/McClaurin expansion of $F_s(x)$ involves the first order derivative:

$$F'_s(x) = \frac{e^{-x}}{1-e^{-x}}, \quad (9)$$

which tends to infinity as x tends to 0. To distance operations from this singularity, the function may be interpolated backwards from a tabular value one LSB greater than the actual value of $x=\log_e(A)-\log_e(B)$ (when A>B), by means of:

$$F_s(x)=F_s(x_o)-(x_o-x)F_s'(x_o), \quad (10)$$

which is the implementation illustrated for logadd in FIG. 3. Then, when at least the most significant bits of x are zero, $x_o$ is one LSB greater in value, just avoiding the singularity.

With the same 16/13-bit split as for addition, the minimum value of $x_o$ is $2^{-11}$ and the size of $F_s'$ is then approximately 2,048 values. However, the value of $F_s'$ is 12 bits longer than its logadd counterparts, which therefore, increases the size of the multiplier for forming $dx \cdot F_s'$ to a 13×26-bit device.

In light of the above, the synergy between real addition and real subtraction as well as for complex operations is thus limited in ALUs implementing interpolation. Thus, the need for both look-up tables and multiplications to perform interpolation makes the traditional interpolation method undesirably complicated to implement in hardware logic.

Iterative Logarithmic Operations

As an alternative to the above-described interpolation process and to reduce the storage requirements, an iterative solution may be used. The iterative solution uses two relatively smaller look-up tables to compute a logarithm output using an iterative process based on tabulated functions. To illustrate the iterative solution, a decimal example is provided to illustrate how $\log_{10}(5)=\log_{10}(3+2)$ and how $\log_{10}(1)=\log_{10}(3-2)$ may be deduced from $\log_{10}(3)=0.4771$ and $\log_{10}(2)=0.3010$.

The logadd function table, also referred to herein as the $F_a$-table, stores 50 values based on Equation (4) for base-10 and for values of x between 0.0 and 4.9 in steps of 0.1. Another table, referred to herein as the correction table or the G-table, stores 99 values for values of y between 0.001 and 0.099 in steps of 0.001 based on:

$$G(y)=-\log_{10}(1-10^{-y}). \quad (11)$$

The following illustrates the two-table iterative process for the above log(5)=log(3+2) example using these two look-up tables. While the following is described in terms of base-10, those skilled in the art will appreciate that any base may be used. For embodiments using a base differing from base-10, it will be appreciated that while Equations (4) and (11) define the function and correction tables, respectively, for base-10 calculations, Equation (12) generically defines the function and correction tables for any base q.

$$F_a(x) = \log_q(1 + q^{-x})$$

$$G(y) = -\log_q(1 - q^{-y}) \quad (12)$$

For the logadd process, the argument $x = A - B = \log_{10}(3) - \log_{10}(2) = 0.1761$ is first rounded up to the nearest tenth, 0.2. From the $F_a$-table of 50 values we find $F_a(0.2) = 0.2124$. Adding 0.2124 to 0.4771 results in a first approximation for $\log_{10}(2+3)$ of 0.6895. The error value resulting from rounding x from 0.1761 to 0.2 is 0.0239. This error will never be more than 0.099, so the 99 value correction look-up table G(y) is used. For the correction value y=0.0239, rounded up to 0.024, the G-table provides a correction value of 1.2695. Combining G(y)=1.2695 with the value from the first look-up table $F_a(0.2) = (0.2124)$ and the original value of x (0.1761) generates a new argument for $F_a$, x'=1.658. Those skilled in the art will appreciate that the prime qualifying the x in this case does not represent differentiation.

When rounded up to the nearest tenth, x'=1.7. $F_a(1.7) = 0.0086$, which when added to the first approximation for $\log_{10}(2+3)$ of 0.6895 gives the second approximation of 0.6981. The error in rounding up 1.658 to 1.7 is 0.042. Looking y=0.042 up in the G-table gives the value 1.035, which when added with the previous $F_a$ value of 0.0086 and with x'=1.658 results in a new x-value, x''=2.7016. After rounding x'' up to 2.8, using the $F_a$-table produces $F_a(2.8) = 0.0007$. Adding 0.0007 to the second approximation (0.6981) gives a third and final approximation of 0.6988, which is considered close enough to the actual value of 0.6990 to the precision expected when using an $F_a$ look-up table of only 50 values and a G look-up table of only 100 values. If desired, a further iteration may be done for a slight increase in precision. However, more than three iterations are generally not necessary for addition. Alternatively, if the maximum number of iterations is preset to three, the argument of $F_a$ for the last iteration may be rounded down to the nearest tenth of 2.7, instead of always up. $F_a(2.7) = 0.0009$, which when added to the second approximation for $\log_{10}(3+2)$ of 0.6981 gives the expected result $\log_{10}(5) = \log_{10}(3+2) = 0.6990$.

The two-table iterative process comprises accepting a 3-step process in return for avoidance of multiplications and a 100-fold reduction in the look-up table sizes. In a hardware implementation, the total number of logic delays required for three iterations may in fact be less than the number of logic delays through the repetitive add/shift structure of a multiplier. In any event, the above-discussed reduction of look-up table size is useful when silicon area and/or precision are of primary importance.

The value for $\log_{10}(3-2)$ may be computed similarly. The starting approximation is the log of the larger number i.e. 0.4771. The $F_s$-table for subtraction stores the values:

$$F_s(x) = \log_{10}(1 - 10^{-x}) \text{ (for base-10)}$$

$$F_s(x) = \log_q(1 - q^{-x}) \text{ (for generic base-q)} \quad (13)$$

in steps of 0.1; the G-table remains the same. The difference between $\log_{10}(3)$ and $\log_{10}(2)$ of 0.1761 is rounded up to the nearest tenth of 0.2. Looking up 0.2 in the subtraction function table produces $F_s(0.2) = -0.4329$. Adding -0.4329 to the starting approximation of 0.4771 generates the first approximation for $\log_{10}(1)$ of 0.0442.

The error in rounding 0.1761 up to 0.2 is 0.0239, as for addition. Addressing the G-table as previously defined with 0.024 returns the value 1.2695. Adding 1.2695 to the previous $F_s$ argument of x=0.1761 and the previous $F_s$-table look-up value of -0.4329 produces a new $F_s$-table argument of x'=1.0127. Rounding x' up to the nearest tenth of 1.1 and using the $F_s$-table again yields $F_s(1.1) = -0.0359$. Adding -0.0359 to the first approximation (0.0442) gives the second approximation for $\log_{10}(1)$ of 0.0083. The error in rounding up 1.0127 to 1.1 was 0.0873. Using the value 0.087 to address the G-table gives G(0.087)=0.7410. When added to the previous unrounded $F_s$-table argument of 1.0127 and the $F_s$-table look-up value of -0.0359 a new $F_s$-table argument of x''=1.7178 is generated. Rounding x'' up to 1.8 results in $F_s(1.8) = -0.0069$ which is added to the second approximation of 0.0083 to obtain a third approximation for $\log_{10}(1)$ of 0.0014. The error on rounding up 1.7178 to 1.8 was 0.0822. Addressing the G-table with 0.082 returns the value 0.7643. Adding this to the previous $F_s$-table argument of 1.7178 and the previous $F_s$-table look-up value of -0.0069 produces a new $F_s$-table argument of x'''=2.4752. Rounding 2.4752 up to 2.5 produces a function value of $F_s(2.5) = -0.0014$. Adding -0.0014 to the third approximation (0.0014) gives $\log_{10}(1) = \log_{10}(3-2) = 0$, as expected. The algorithm converges because the argument of $F_s$ increases for each iteration, resulting in smaller and smaller corrections.

The above process for subtraction was the same as for addition apart from the use of the subtraction-version of the F-table. However, both addition and subtraction use the same G-table. Further, subtraction required one more iteration than addition to provide good accuracy; this is because the argument of $F_s$ rises slightly less rapidly with each iteration, especially with the first iteration, because the increment upon adding the $F_s$-value is negative in the case of subtraction.

High Precision Logadd

In general, the logadd problem to be solved for more general base-q logarithms may be given by the following steps:

Suppose $A = \log_q(a)$ and $B = \log_q(b)$, where a and b are positive numbers and q is the base.

Goal: find $C = \log_q(c)$ where $c = a + b$.

Thus, $C = \log_q(a+b) = \log_q(q^A + q^B)$,

Let A be the larger of A and B.

Then $C = \log_q(q^A(1 + q^{-(A-B)}))$ $\quad = A + \log_q(1 + q^{-(A-B)})$ $\quad = A + \log_q(1 + q^{-r})$, where $r = A - B$ and is positive.

Thus, the problem has been reduced to computing the function $\log_q(1 + q^{-r})$ of the single variable r.

If r has a limited word length, the function value may be obtained by a function look-up table. For example, for a 16-bit r-value, a function look-up table must store 65,536 words. Moreover, if r>9 in the case of base q=e=2.718, the value of the function will differ from zero by less than $2^{-13}$, which suggests that only a 4-bit whole part of r ranging up to 15 need be considered, together with a 12-bit fractional part. Then for r>9, the function value is zero to 12 binary places after the point, so the look-up table is only required for values of r up to 9, giving 9×4,096=36,864 words of memory.

Because the maximum value of the function is $\log_e(2)=0.69$ when $r=0$, only the 12-bit fractional part need be stored, so the memory requirements are only 36,864 12-bit words rather than 65,536, 16-bit words. In the case of base-2, the function is zero to 12 binary places for $r>13$, so again a 4-bit whole part of r only need be considered. If one bit is used for a sign, then the logmagnitude part is only 15 bits long, for example 4.11 format or 5.10 format, and the above figures may be adjusted accordingly.

To obtain much higher accuracies than 16 bits however, using for example word lengths of 32 bits, a direct look-up table for the function is excessively large. For example, to give accuracy and dynamic range comparable to the IEEE 32-bit floating-point standard, A and B should have 7-bit whole parts, 24-bit fractional parts and a sign bit each in the base-e case. The value of r must now be greater than 25 $\log_e(2)=17.32$ before the function is zero to 24-bit accuracy, which is representable by a 5-bit positive whole part of r. Thus, a potential 29-bit r-value of format 5.24 must be considered as the argument of the function $F_a$. A look-up table size of $18 \times 2^{24}$ or 302 million 24-bit words is required for a direct look-up of r for values between 0 and 18. Substantially all research into logarithmetic operations concerns reducing these table sizes, with the ultimate aim of making 64-bit word lengths practical. Several techniques described herein advance the art towards this goal.

To reduce the size of the look-up table from a single large table, as required for a direct look-up of the logadd function $F_a$ that uses all the bits of r as the address, one implementation of the invention comprises splitting r into most significant (MS) and least significant (LS) parts, $r_M$ and $r_L$, respectively. These MS and LS parts address two much smaller tables, F and G, respectively, as will be described below. The MS portion represents a "rounded-up" version of the input value, while the LS portion represents the difference between the rounded-up version and the original full argument value.

Let $r_M$ be the most significant 14 bits of $r<32$ and $r_L$ be the least significant 15 bits of r, as shown in Equation (14).

$r_M$=xxxxx.xxxxxxxxx $r_L$=00000.000000000xxxxxxxxxxxxxxx (14)

For simplicity, the length of $r_M$ and $r_L$ may be denoted as (5.9) and (15) for short. Other splits of r into most and least significant bit parts are equally useable by obvious modifications to the method, and some considerations for preferring a particular split, discussed further below, concern the ability to re-use the same F and G tables for other wordlengths (e.g., 16 bits) or for complex operations.

Let $r_M^+$ be the value of $r_M$ augmented by the greatest possible value of $r_L$, i.e., 00000.000000000111111111111111. It will be realized that this is just the original r-value with its least significant 15 bits set to 1's. In some implementations, $r_M$ may alternatively be augmented by 0.000000001, i.e., $r_M^+$=xxxxx.xxxxxxxxx+00000.000000001. (15)

Let a complementary value of $r_L$ be represented by:

$r_L^-=r_M^+-r$, (16)

which is then either the complement or the two's-complement of $r_L$ depending on which of the above two alternative augmentations for $r_M$ is used, i.e., $r_L^-$=00000.000000000111111111111111– 00000.000000000xxxxxxxxxxxxxxx (the complement of $r_L$) or $r_L^-$=00000.000000001000000000000000– 00000.000000000xxxxxxxxxxxxxxx (the twos-complement of $r_L$). Then the following for base-e results:

$$\log_e(1+e^{-r}) = \log_e(1+e^{-r_M^+} - e^{-r_M^+} + e^{-r}) \quad (17)$$

$$= \log_e\left((1+e^{-r_M^+})\left(1+\frac{(e^{-r}-e^{-r_M^+})}{(1+e^{-r_M^+})}\right)\right)$$

$$= \log_e(1+e^{-r_M^+}) + \log_e(1+e^{-r'}),$$

where $r'=r+\log_e(1+e^{-r_M^+})-\log_e(1-e^{-r_L^-})$. Expanding log $(1+e^{-r'})$ likewise results in:

$\log_e(1+e^{-r'})=\log_e(1+e^{-r'_M+})+\log_e(1+e^{-r''})$, (18)

where $r''=r'+\log_e(1+e^{-r'_M+})-\log_e(1-e^{-r'_L})$. Iterating to a conclusion shows that the desired answer comprises the sum of functions:

$\log_e(1+e^{-r_M+})$, $\log_e(1+e^{-r'_M+})$, $\log_e(1+e^{-r''_M+})$, (19)

etc., that depend only on the most significant 14 bits of their respective r-arguments, which may then be obtained from a look-up table of only 16,384 words.

In the context of Equations (17)-(19), the prime(s) used to qualify the denoted r-values do not represent a derivative. Instead, the succession of r-values r, r', r", etc., is derived by accumulating to the preceding value the value just obtained from the logadd function look-up table ($F_a$) and adding a value depending on the least significant 15-bits of r, namely the value $-\log_e(1-e^{-r_L+})$, which is given by a correction look-up table, i.e., the G-table, which has 32,768 words because $r_L^-$ is a 15-bit value.

Although the stored values are computed from $r_M^+$ and $r_L^-$, the function and correction look-up tables may be directly addressed by $r_M$ and $r_L$, respectively. Calling these look-up table functions $F_a$ and G respectively, and noting that correction values are always highly negative, a positive correction value may be stored in the G-table. This positive correction value is added to the previous r-argument, instead of storing a negative value and subtracting it. Further, the minimum correction value of the G-table, or the whole part of it at least, may be subtracted from the stored values to reduce the number of bits stored, and added back whenever a value is pulled from the table. For base-2, a value of 8 is appropriate for the minimum correction value and does not even need to be added back in some implementations. The iteration is then:

1. Initialize the output accumulator value C to the larger of A and B.
2. Initialize r to A–B if A is larger, or B–A if B is larger.
3. Split r into $r_M$ and $r_L$.
4. Look-up $F_a(r_M^+)$ and $G(r_L^-)$ as addressed by $r_M$ and $r_L$, respectively.
5. Accumulate $F_a$ with C and $F_a$+G with r.
6. Repeat from step 3 if r<STOP_THRESHOLD (discussed further below).

Those skilled in the art will appreciate that a few logic gates may be used to detect an r-value greater than 18 using the logic b6.OR.(b5.AND.(b4.OR.b3.OR.b2)) (the 32 bit set, or the 16 bit set with one of the 8, 4 or 2 bits set), where the bit index indicates the bit position to the left of the point. The value of the function $G(r_L^-)=\log_e(1-e^{-F_L^-})$ is always greater than 6.24 approximately, therefore the iteration always terminates in 3 cycles or less. Correction values are proportionally larger for base-2, so that r always exceeds 25 in at most 3 cycles for base-2 also. In general, 3 cycles typically suffice for any base.

High Precision Two-Table Logsub

If the signs S associated to A and B indicate a and b have the same sign, then the foregoing logarithmic addition algorithm, hereby dubbed "logadd," may be used. Otherwise a logarithmic subtraction algorithm, hereby dubbed "logsub," is required. The following table indicates when the respective algorithms are used:

| sign(a): | sign(b): | To add: | To subtract b from a: |
|---|---|---|---|
| + | + | Use logadd(A, B) | Use logsub(A, B) |
| + | − | Use logsub(A, B) | Use logadd(A, B) |
| − | + | Use logsub(B, A) | Use logadd(A, B) |
| − | − | Use logadd(A, B) | Use logsub(A, B) |

The sign of the result will always be the sign associated with the greater logmagnitude when the logadd algorithm is used.

The same holds true for the logsub algorithm if the sign associated with the second argument is first inverted. Inversion of the sign of the second argument may be done upon application of the second argument to the input of the logarithmic unit, when subtraction is desired. The "logsub" algorithm is derived as follows: Suppose A=log(|a|) and B=log(|b|) are given. It is desired to find C=log(c) where c=|a|−|b|. Let A be the larger of A and B. Dropping the absolute value characters (| |) for clarity, and with a and b both now assumed positive, we have:

$$C = \log_e(a-b) = \log_e(e^A - e^B). \quad (20)$$

As with logadd, base-e is used in this example for illustration purposes only, and therefore, is not limiting.

Because A is assumed to be larger than B:

$$C = \log_e(e^A(1 - e^{-(A-B)})) \quad (21)$$
$$= A + \log_e(1 - e^{-(A-B)})$$
$$= A + \log_e(1 - e^{-r}),$$

where r=A−B and is positive. Thus, the problem reduces to computing the function $\log(1-e^{-r})$ of the single variable r. Let $r_M$, $r_L$, $r_M^+$ and $r_L^-$ be as previously defined. Then, for base-e:

$$\log_e(1 - e^{-r}) = \log_e(1 - e^{-r_M^+} + e^{-r_M^+} - e^{-r}) \quad (22)$$
$$= \log_e\left((1 - e^{-r_M^+})\left(1 - \frac{(e^{-r} - e^{-r_M^+})}{(1 - e^{-r_M^+})}\right)\right)$$
$$= \log_e(1 - e^{-r_M^+}) + \log_e(1 - e^{-r'}),$$

where $r'=r+\log_e(1-e^{-r_{M^+}})-\log_e(1-e^{-r_L^-})$. Expanding $\log_e(1-e^{-r'})$ likewise results in:

$$\log_e(1 - e^{-r'}) = \log_e(1 e^{-r'_{M^+}}) + \log_e(1 - e^{-r''}), \quad (23)$$

where $r''=r'+\log_e(1-e^{-r'_{M^+}})-\log_e(1-e^{-r'_L^-})$, and so forth. Iterating to a conclusion shows that the desired answer comprises the sum of functions:

$$\log_e(1 e^{-r_{M^+}}),$$
$$\log_e(1 e^{-r'_{M^+}}),$$
$$\log_e(1 e^{-r''_{M^+}}), \quad (24)$$

etc., that depend only on the most significant 14 bits of the respective full wordlength r-values, which may be given by a look-up table of only 16,384 words.

As with logadd, the look-up tables for logsub may be constructed to be directly addressed by $r_M$ and $r_L$ although the stored values are computed from $r_M^+$ and $r_L^-$. Further, as with logadd, the prime(s) used to modify the denoted r-values do not represent a derivative.

Calling these look-up tables $F_s$ and G (G is the same look-up as for the logadd algorithm) respectively, and storing the positive value of G as before produces the required $F_s$ and G tables for logsub operations. Because $1-e^{-r}$ is always less than 1, $F_s$ will always be negative, so a positive magnitude may be stored and subtracted rather than added. Another method stores the negative value stripped of its negative sign bit, the negative sign bit being replaced outside the look-up table by appending a most significant '1' when subtraction is underway. The preferred choice is that which leads to simplicity of logic and maximum synergy of look-up table values between addition and subtraction, as discussed further below. In any event, the following steps outline the "logsub" process:

1. Initialize the output accumulator value C=larger of A and B.
2. Initialize r to A-B if A is larger, or B-A if B is larger.
3. Split r into $r_M$ and $r_L$.
4. Look-up $F_s(r_M^+)$ and $G(r_L^-)$, addressed by $r_M$ and $r_L$, respectively.
5. Accumulate $F_s$ with C and $F_s$+G with r.
6. Repeat from step 3 if r<STOP_THRESHOLD (discussed below).

For both the LOGADD and the LOGSUB algorithms, STOP_THRESHOLD is chosen so that any contribution from a further iteration will be less than half an LSB. This occurs at 17.32 for base-e (can use 18) with 24 binary places after the point, or at 24 for base-2 with 23 binary places after the point. In principle, a base less than base-2 may be found that gives a STOP_THRESHOLD of 31, which would then use an F-function defined over the whole address space addressable by the selected MSBs of r. Alternatively, a base greater than base-e, may be found that gave a STOP_THRESHOLD of 15, with the same property. However, the practical advantages of base-2 seem greater than any advantage of using a full address space for the F-tables. In general, for base-2, STOP_THRESHOLD is simply 1 or 2 greater than the number of binary places of the log-representation after the point.

As suggested by the decimal examples given above, the accuracy after a finite number of iterations is improved if the final argument used to address the F-table, e.g., $r'''_M{}^+$, is rounded down rather than up from $r'''_M$. If the two-table iterative process always performs a fixed number of iterations, or if the process otherwise identifies the final iteration, the argument of F may be rounded down on the final iteration. The final iteration may be identified, for example, by r being within a certain range (~6 for base-e, or ~8 for base-2) of STOP_THRESHOLD, indicating that the next iteration is bound to exceed STOP_THRESHOLD. When this method is used, the address to the F-table may be reduced by 1 if the leftmost bit of $r_L$ is zero on the final iteration. In the pipelined implementation to be described, the final F-table contents are simply computed for a rounded-down argument.

The only difference between the LOGSUB and LOGADD algorithms is the use of the look-up table $F_s$ rather than $F_a$. Because both are of size 16,384 words, they may be combined into a single function F-table with an extra address bit to select the + or − version, denoted by $F(r_M, \text{opcode})$, where the extra argument "opcode" is the extra address bit having the value 0 or 1 to indicate whether to apply the LOGADD or LOGSUB algorithm. Alternatively, because the peripheral logic (i.e. input and output accumulators and adders/subtractors) is small compared to the respective look-up tables, it costs little to duplicate the peripheral logic to form an independent adder and subtractor. Yet another possibility considered below is to exploit the similarity between the functions $F_a$ and $-F_s$.

Exponential Approximation

As discussed above, $r_M^+$ may comprise either $r_M$ augmented by the largest possible value of $r_L$ (0.000000000111111111111111) or may comprise $r_M$ augmented by 0.000000001. An advantage in choosing the augmentation of $r_M$ to be 0.0000000001111111 . . . 1 instead of 0.000000001 is that the G table may be addressed by either the complement of $r_L$ during the iterative algorithm, or may be addressed by $r_L$ (not complemented) to get the value of F directly in the case $r_M=0$, thus allowing a single iteration to suffice for the otherwise difficult case of subtracting two nearly equal values. Making both the complemented and non-complemented values available is simpler and faster than forming the twos-complement, as no carries need to be propagated.

For logadd, the values of the $F_a$-table may be defined by:

$$F_a(X_M) = \log_2(1 + 2^{-(X_M+d)}), \quad (25)$$

where d represents an increment that is preferably the largest possible value of $X_L$, i.e., all 1's. The function can be constructed as a look-up table addressed by $X_M$. For subtraction, the values of the $F_s$-table may be defined by:

$$F_s(X_M) = -\log_2(1 - 2^{-(X_M+d)})). \quad (26)$$

$F_a(X_M) = F_s(X_M)$ for large values of $X_M$ and, for 32-bit arithmetic and an argument range between 16 and 24, may both be approximated adequately by:

$$E = 2^{-X_{M1}} \cdot \left( \frac{2^{-0 \cdot X_{M2}}}{\log_e(2)} \right), \quad (27)$$

where $X_{M1}$ is the whole part (bits to the left of the point) of $X_M$ and $X_{M2}$ is the fractional part, i.e. bits to the right of the point. The function in brackets may be stored in a small exponential look-up table. A right shifter may implement the whole part so that only the fractional bits need address the exponential function, reducing the table size.

Figure 4:
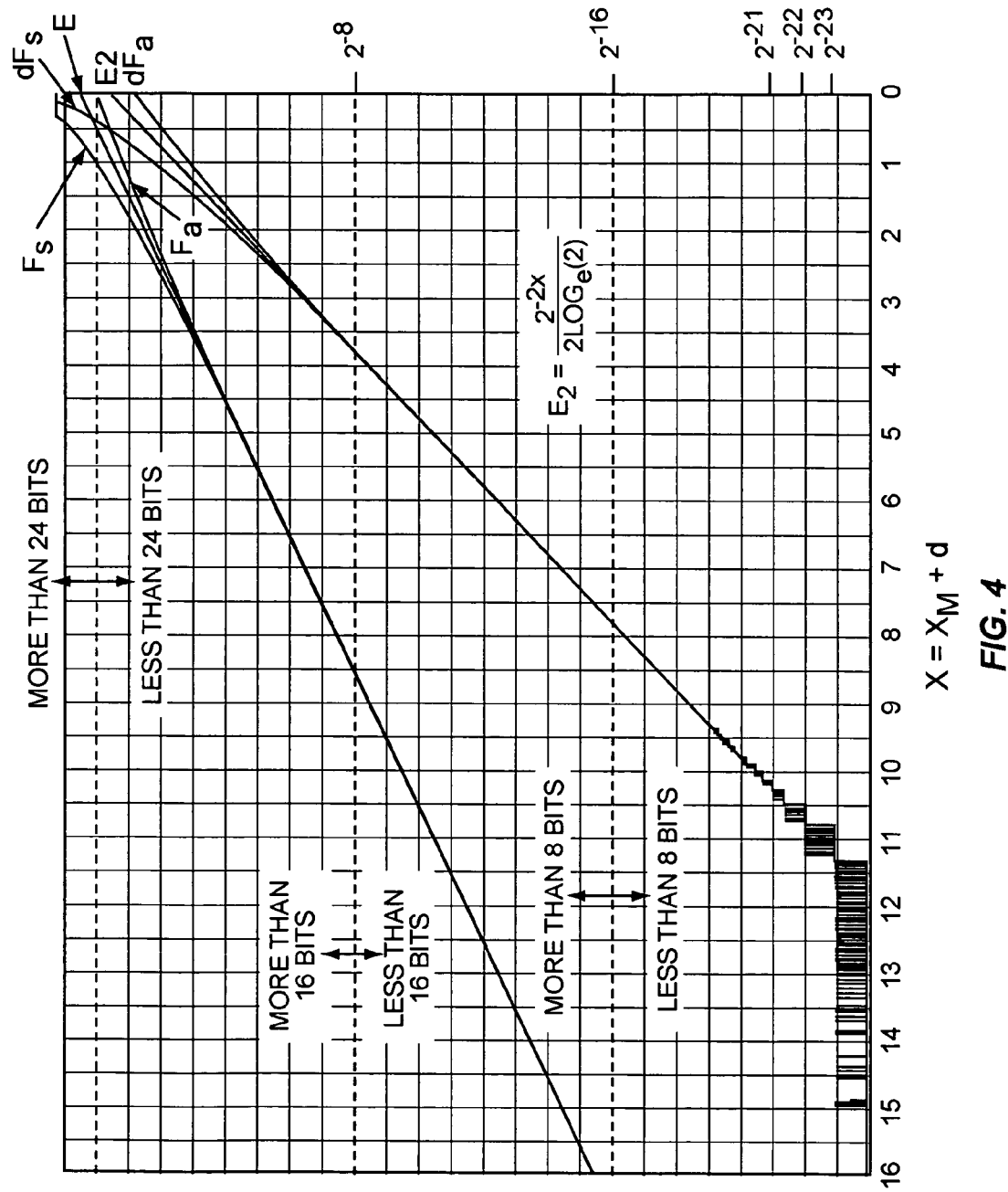
FIG. 4 illustrates a plot comparison between the true F-functions and an exponential approximation.

FIG. 4 illustrates the similarities between the exponential approximation (E) and the true function values ($F_a$, $F_s$). When the argument ranges between 16 and 24, E is substantially equivalent to both $F_a$ and $F_s$. Further, FIG. 4 also illustrates how a further approximation:

$$E_2 = \frac{2^{-2(X_M+d)}}{2\log_e(2)} \quad (28)$$

also adequately approximates the difference between the exponential approximation and the true function values, $dF_a = E - F_a$ and $dF_s = F_s - E$. Therefore, for $X_M$ in the range 8 to 16, the exponential approximation E may be used when it is corrected by the small correction value $E_2$ less or equal to 8-bits in length, as may be seen from FIG. 4. The result is 17 bits in length when 24 places after the binary point are required.

Because the area under the E curve roughly approximates the silicon area required to implement the exponential approximation, FIG. 4 also illustrates the approximate silicon area required to implement the function tables for logadd and logsub operations. Using a base-2 logarithmic scale as the vertical scale means the height represents the wordlength of a binary value. The horizontal scale represents the number of such values. Therefore, the area below the curve represents the number of bits of ROM required to store the curve values. The exponential function E is cyclic however, its values repeating except for a right shift for every increment of 1. Thus, only one cycle addressed by the fractional part $X_{M2}$ need be stored and the result shifted a number of places given by $X_{M1}$. The exponential function E, therefore, requires very small tables. Further, because the correction values dF or $E_2$ clearly have a smaller area under their curves than the original $F_a$ and $F_s$ functions, using the exponential approximation E and storing corrections dF and $E_2$ requires smaller table sizes, and therefore less silicon area, than storing $F_a$ and $F_s$.

Equation (29) gives the G-function for the least significant bits as:

$$G(X_L) = -\log_2(1 - 2^{-(d-X_L)}), \quad (29)$$

where $(d-X_L)$ is equal to the complement of $X_L$ when d is all 1's. The minimum value of $G(X_L)$ depends on the split of the 31-bit logmagnitude between $X_M$ and $X_L$. If $X_M$ is of the form 5.8 then $X_L$ is of the form 0.00000000xxxxxxxxxxxxxxxx and less than $2^{-8}$. The minimum value of G is then 8.5 when $X_L=0$. For $X_M$ of the form (5.7), the minimum value of G=7.5, and for $X_M$ of format (5.9), the minimum value of G=9.5. Because the value of X increases by at least the value of G at each cycle, X will exceed 24 within 3 cycles as long as the three G values are on average greater than 8. In the following, the assumption of 32-bit arithmetic is maintained for the purposes of illustration. When the minimum value of G is 8.5, a base value of 8 may be subtracted from the stored values.

Logarithmic Arithmetic for Complex Numbers

The various processes discussed above apply generally to logarithmic arithmetic for real numbers. However, radio communication signals may utilize both real and complex number representations. For example, typical applications for real and complex signal processing include radio signal processing. In a radio system, signals received at an antenna contain radio noise, and can be represented by a sequence of complex-number samples. It is usually desirable to recover information using the weakest possible signals relative to the noise, so as to maximize range. The complex representation of samples gathered from the antenna therefore does not require high precision digitization, as it is not useful to employ quantizing accuracy much better than the expected noise levels. After processing the complex noise signal to recover information and correct errors, however, the noise is hopefully removed; the resulting information may now require a higher precision representation. For example, speech may be represented by a sequence of real-number samples, but because the processed raw antenna signal raises the fidelity of the signal to noise ratio of the speech, a higher precision digital representation may be required.

A signal processor that provides both high precision arithmetic on real numbers and lower precision arithmetic on complex numbers is therefore of interest in radio applications such as cellphones and cellphone systems. Such a processor may comprise a memory for program storage, a data memory for storing the real and complex data being processed, a real and complex Arithmetic/logic Unit (ALU), and input and output arrangements that may include analog-to-digital and digital-to-analog converters. The data memory stores words of the same word length for which the ALU is designed; it is logical to use the same word length for real and complex numbers so that they can be stored in the same memory. However the present invention does not require this.

Typically, 16-bit words are sufficient for speech processing. Therefore, it is of interest to determine if a 16-bit complex representation provides adequate dynamic range for representing noise signals received by the antenna. This was proven to be the case in the first digital cellphones manufactured and sold by L. M. Ericsson in Europe and by its US affiliate Ericsson-GE in the 1988-1997 time period, which used a 15-16 bit logpolar representation comprising an 8-bit logamplitude and a 7 bit phase. These products also used direct digitization of the radio signal into complex logpolar form according to U.S. Pat. Nos. 5,048,059; 5,148,373 and 5,070,303 which were implemented in combination, and are hereby incorporated by reference.

As for real numbers, any base may be used for the logarithm of the amplitude. If base-e is used, the logamplitude expresses the instantaneous signal level in Nepers. As known in the art, 1 Neper equals 8.686 decibels (dB) approximately, so an 8-bit logamplitude in the format xxxx.xxxx represents a signal level varying over a range of 0 to 15 and 15/16ths Nepers, ~139 dB.

The quantizing error is half the least significant bit or +/− 1/32 of a Neper or 0.27 dB, which is a percentage error of approximately 3.2%. In theory, this error is uniformly distributed between +/− 3.2% and has an RMS value of $1/3^{rd}$ of the peak, i.e. around 1%. The quantizing noise is thus $1/100^{th}$ of the signal level, i.e. 40 dB below the signal level, and may be less if over-sampling is used—i.e. sampling at greater than the Nyquist rate of 1 sample per second per Hz of signal bandwidth.

An advantage of logpolar representation is that this quantizing accuracy stays constant over the whole range of signal levels. A quantizing noise of −40 dB with a total dynamic range of 139 dB is considered more than adequate for most radio signal applications.

Figure 5B:
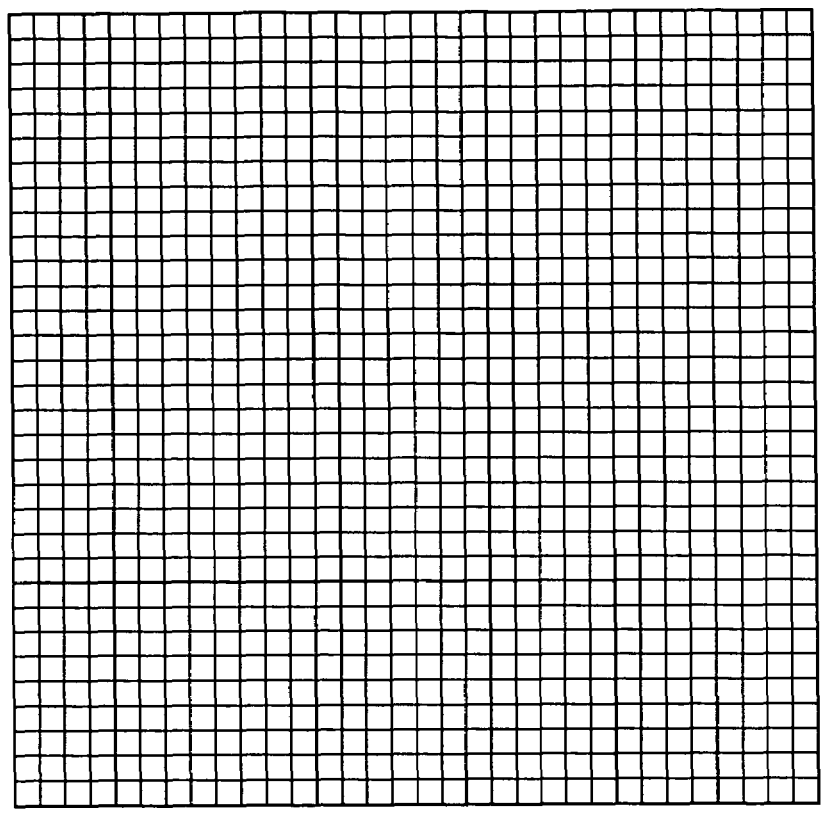
FIGS. 5A and 5B illustrate quantizing regions for logpolar and Cartesian representations, respectively.
Figure 5A:
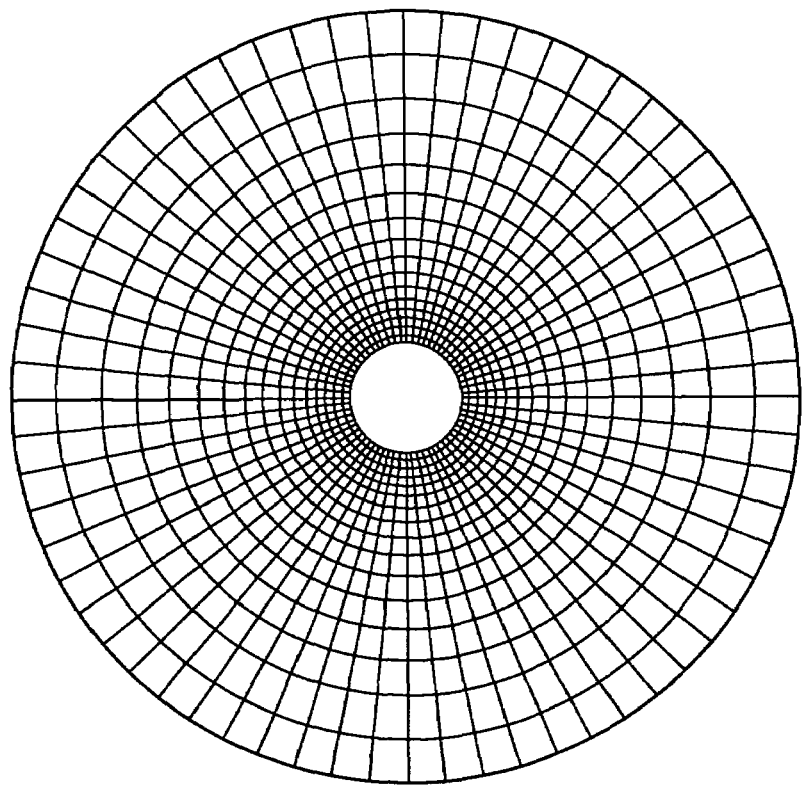

FIG. 5A illustrates how the complex plane is segmented into elemental areas using logpolar representation in contrast with the Cartesian representation of FIG. 5B. The white "hole" in the middle of the logpolar chart is where the signal level is less than 0000.0000 Nepers while the outer circle is the highest signal level of 1111.1111 Nepers. If the lower limit of 0000.00000 is chosen to be 10 dB below radio noise level, this ensures that noise excursions will be adequately represented, and that the statistics of the noise are not unduly corrupted by the number representation. Thus, the outer circle then represents a signal level of 129 dB over noise, which is unlikely to be exceeded even by the strongest signals.

The finite number of bits used to represent phase angle also causes quantizing error and noise. The noise contribution from the phase quantizing has an RMS value of 1/12 of the smallest phase bit value in radians. If 8 bits are used to represent phase, the smallest phase bit has a value of 2π/256 radians, and the quantizing noise is thus 2π/(12*256)=0.002 or −53.8 dB relative to the signal level. This is less than the −40 dB logamplitude quantizing noise.

A bit assignment of 1 bit more of amplitude and one bit less of phase would make the logamplitude quantizing about −46 dB and the phase quantizing noise −47.8 dB. Thus a logpolar format of xxxx.xxxxx for logamplitude and 0.xxxxxxx (modulo 2π) for phase is suggested when a 16-bit wordlength is used.

If base-2 logarithms are used to represent logamplitude, the quantizing noise of the xxxx.xxxxx format is reduced by $\log_e(2)$ or 3.18 dB to −49 dB. The dynamic range is reduced from 16 Nepers, or 139 dB to 16×6 dB=96 dB, which is still adequate.

Logpolar numbers may be stored logamplitude first, i.e. {xxxx.xxxxx; 0.xxxxxxx}={log(r); θ} or phase first, i.e. {0.xxxxxxx; xxxx.xxxxx}32 {θ; log(r)}. It may be useful to think of phase as an extension of the 1 bit "phase" or sign of a real number to represent more than just the two angles 0 and 180 degrees in the case of a complex number, and therefore the "phase-first" format provides a logical format for portraying this. In complex arithmetic, little distinction can be made between add and subtract, as combining numbers differing by 0 degrees (i.e. adding) or 180 degrees (i.e. subtracting) are just two points within the whole range of relative phase angles to be considered.

Using logpolar format, the product of two complex numbers is obtained by fixed point addition of the logamplitude part (taking note of underflow or overflow) and fixed point addition of the phase parts ignoring overflow, as the angle is computed modulo-2π. When the binary phase word quantizing levels are evenly spaced over the range 0-2π, the rollover upon binary addition exactly corresponds to modulo-2π arithmetic, as required for phase computations. Likewise, the quotient of two logpolar complex numbers is obtained by fixed point subtraction.

In considering use of the same ALU for 16-bit logreal and 16-bit logpolar operations, it may be realized that the only difference in adding or subtracting is that, in the logpolar case, any carry or borrow from addition or subtracting of logamplitude parts is not permitted to propagate into the phase part of the adder or subtractor, nor vice versa if the logamplitude-first format is used.

To illustrate how logarithmic arithmetic may be implemented on complex numbers represented in a logpolar format, consider the following. Let Equation (30) represent two Cartesian complex numbers, $z_1$ and $z_2$, in logpolar format for base-e, $Z_1$ and $Z_2$.

$$Z_1 = (R_1, \theta_1) = \log_e(z_1)$$

$$Z_2 = (R_2, \theta_2) = \log_e(z_2) \quad (30)$$

To determine $Z_3 = \log_e(z_3)$ where $z_3 = z_1 + z_2$, we may implement a similar procedure to the one discussed above with respect to real numbers. First, we note that:

$$Z_3 = \log_e(z_1 + z_2) = \log_e(e^{Z_1} + e^{Z_2}) \quad (31)$$

Assuming that $Z_1$ has a larger logmagnitude ($R_1$) than $Z_2$, and applying logic similar to that discussed above, $Z_3$ may be represented as:

$$Z_3 = \log_e(e^{Z_1}(1 + e^{-(Z_1 - Z_2)})) \quad (32)$$
$$= Z_1 + \log_e(1 + e^{-(Z_1 - Z_2)})$$
$$= Z_1 + \log_e(1 + e^{-Z}),$$

where $Z = Z_1 - Z_2$ has a positive real part $R_1 - R_2$ because $R_1 > R_2$, which guarantees that the magnitude of $e^{-Z} < 1$. Thus, the problem of computing $Z_3$ given $Z_1$ and $Z_2$ is now reduced to computing the function $\log_e(1 + e^{-Z})$ of the logpolar complex variable $Z = (R + j\theta)$, where $R = R_1 - R_2$ and $\theta = \theta_1 - \theta_2$. While the above example uses base-e, those skilled in the art will appreciate that any base may be used.

When R>6, addition or subtraction of the smaller value will not affect the $5^{th}$ binary place, and the result is the larger value. Therefore, only 3 bits to the left of the binary point need be considered for R.

The function $\log_e(1+e^{-Z})$ may be computed according to a wide variety of means. For example, a single table, single iteration process may be used. While applicable to low and high precision numbers, the size of a single look-up table required for high-precision numbers may be prohibitively large. The look-up table may have an optimum structure. For example, for 16-bit logpolar arithmetic, it may be useful to store, in pairs, values for addresses differing by $\pi$ in their $\theta$-component, giving a 16,384×32-bit ROM, or half that if conjugate symmetry is exploited. A complex logarithmic addition and a complex logarithmic subtraction of the same pair of input values may then be done simultaneously in one cycle.

Figure 6:
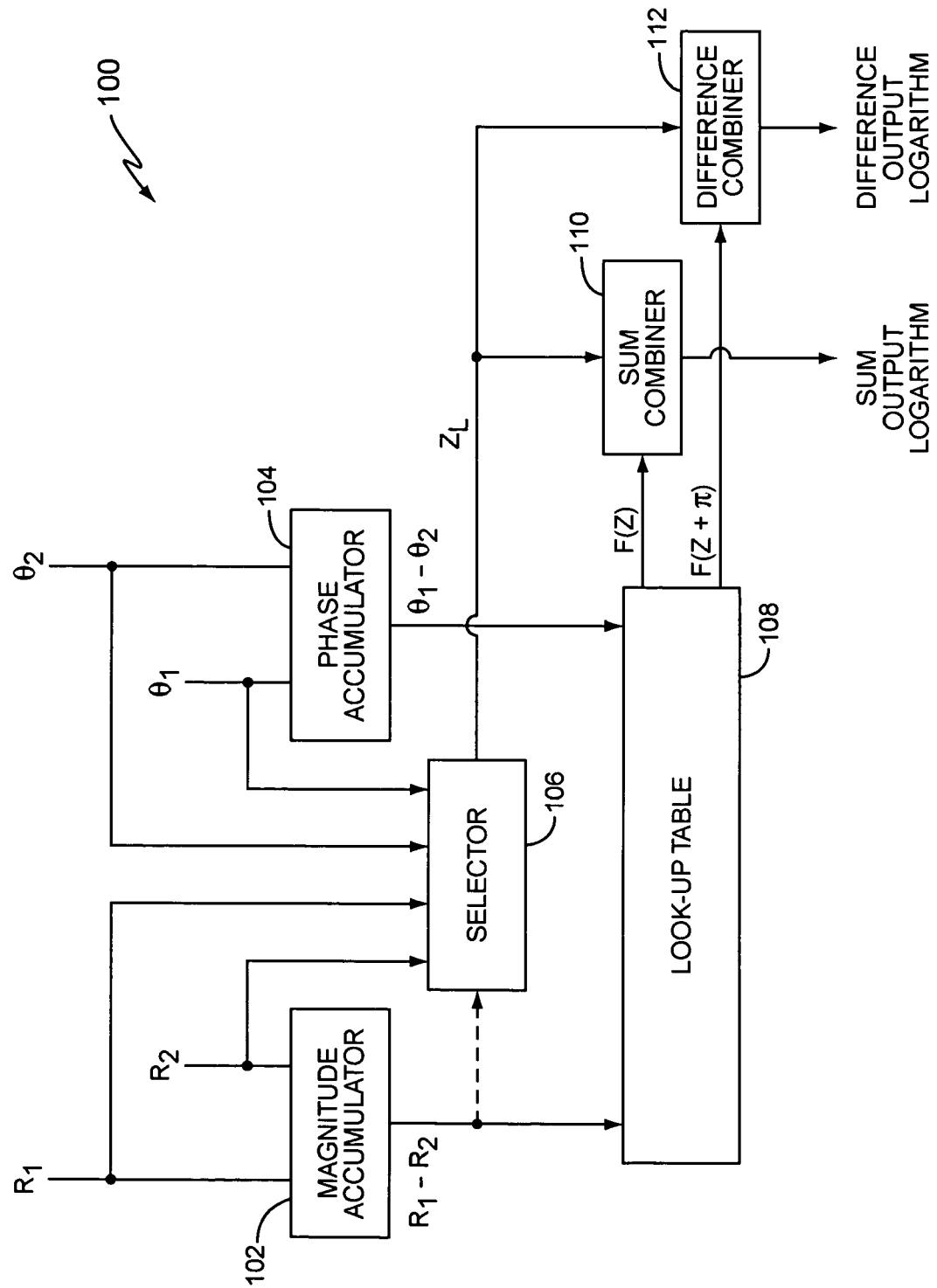
FIG. 6 illustrates a block diagram of one exemplary ALU for simultaneously performing logadd and logsub operations.

Simultaneous adds and subtracts of a pair of values in one cycle are known as Butterfly operations, and are typically performed in a Butterfly circuit. FIG. 6 illustrates an exemplary ALU comprising a low-precision complex Butterfly circuit 100. Butterfly circuit 100 comprises magnitude accumulator 102, phase accumulator 104, selector 106, look-up table 108, sum combiner 110, and difference combiner 112. When $R_1$ is greater than $R_2$, logmagnitude accumulator 102 computes a logmagnitude difference represented by $R=R_1-R_2$, while phase accumulator 104 computes a phase angle difference represented by $\theta=\theta_1-\theta_2$. Alternatively, when $R_2$ is larger than $R_1$, magnitude accumulator 102 computes a logmagnitude difference represented by $R=R_2-R_1$, while phase accumulator 104 computes a phase angle difference represented by $\theta=\theta_2-\theta_1$. Magnitude accumulator 102 and phase accumulator 104 output the computed differences to look-up table 108.

Look-up table 108 contains logarithmic values for complex numbers of all angles. The logmagnitude difference and the phase difference address look-up table 108 to provide two logpolar values $F(Z)$ and $F(Z+\pi)$. If desired, this table may be halved in size by always using a positive angular argument and conjugating the output $F(Z)$ values when the original angular address is negative.

Magnitude accumulator 102 also controls selector 106 to select either $Z_1$ or $Z_2$ as $Z_L$, based on the larger of $R_1$ and $R_2$. Selector 106 provides $Z_L$ to sum combiner 110 and difference combiner 112. Combiners 110, 112 add $Z_L$ to the two look-up table outputs $F(Z)$ and $F(Z+\pi)$ to yield the sum output logarithm and the difference output logarithm associated with the two input complex numbers, thereby performing a complex Butterfly in one operation.

Butterfly operations are often useful for performing Fast Fourier Transforms (FFTs) needed for various signal processing operations, such as Orthogonal Frequency Division Multiplex (OFDM) signal decoding. For base-2 FFT operations, it is common to modify the phase angle by multiples of $2\pi/2^N$, where $2^N$ is the size of the FFT. In logpolar format, these phase rotation operations, known as twiddles, are trivial and involve only adding multiples of quantities like 0.0001000 to the phase part. Because it is easy to modify the phase angle in butterfly circuit 100, very efficient butterflies and twiddles may be performed by applying complex numbers represented in the logpolar format to butterfly circuit 100, making it very advantageous for FFTs. No rounding occurs in the twiddle operations as long as the FFT is base-2 and N is less or equal to the wordlength of $\theta$. For other than base-2 FFTs, a special logpolar format may be devised in which $\theta$ was expressed using the same radices as the FFT bases. The algorithm described herein could be used in such a device by suitably adapting the look-up tables.

Figure 7:
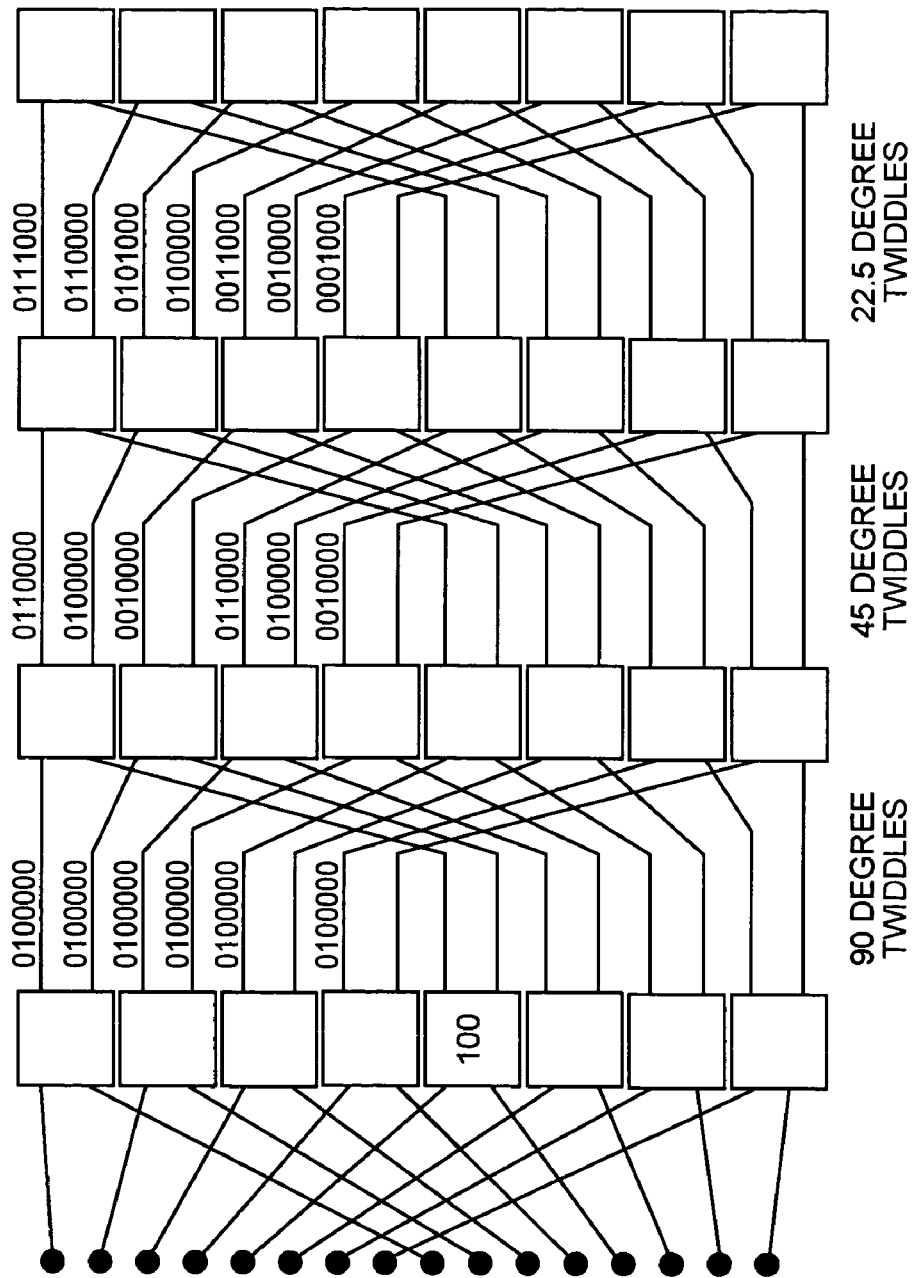
FIG. 7 illustrates an implementation of a 16-point FFT using the ALU of FIG. 6.

FIG. 7 illustrates the implementation of an exemplary 16-point FFT using multiple complex butterfly circuits 100, e.g., those shown in FIG. 6. Butterfly circuit 100 combines pairs of values, selected 8 apart in the 16-element array. Selected sum and difference outputs are then modified in their angular part to effect the complex rotations known as twiddles. The angles are modified by modulo-$2\pi$ addition of the bit patterns illustrated. Modulo-$2\pi$ addition is simply modulo-128 addition when 7-bit angular parts are used, as illustrated. Such an FFT may be implemented using either 8×4=32 copies of the butterfly circuit 100 for full, parallel processing and computation of a complete FFT per machine cycle. Alternatively, such an FFT may be implemented using a single column of 8 butterfly circuits 100 successively to implement each of the four columns of computations in turn. Further, a single butterfly circuit 100 may be repeatedly used 32 times to perform the FFT. These options depend on the desired trade-off between speed and size or cost.

The advantage of logpolar quantization compared to Cartesian representation of complex values may be realized by considering the problem of representing a signal to, say 1% accuracy, when the signal can appear anywhere over a 60 dB dynamic range. This may arise in receivers for burst-mode transmissions that provide the receiver with no warning about the expected signal level. To represent the Cartesian parts to 1% accuracy requires a least step of approximately 1/64, that is 6 bits to the right of the binary point, if the minimum signal level is of the order of 1. To represent signals over a 60 dB range however requires representing signals 1000 times larger than that, requiring an additional 10 bits to the left of the binary point. Both the real and imaginary parts thus need to have the format S10.6, making a total of 34 bits. However, as shown above, this same quantizing accuracy and dynamic range is achieved using only 16 bits in logpolar format If higher precision is needed than can be accommodated with a single look-up table of reasonable size, the two-table iterative method previously described for real numbers may be adapted for complex numbers. A complex number format fitting within the 32-bit wordlength of the high-precision real format is for example illustrated by 0.xxxxxxxxxxxxxxx; xxxxx.xxxxxxxxxxxx)

or (0.15; 5.12) for short in the phase-first format. Choosing the number of bits of phase to be 2 or 3 more than the number of bits to the right of the binary point for logamplitude gives similar quantizing error for phase and amplitude. The least significant bit of the 15-bit phase has a value of $2\pi \times 2^{-15}=6.28\times 2^{-15}$. A change in the $12^{th}$ binary place of R=log(r) gives $d(\log(r))=dr/r=2^{-12}=8\times 2^{-15}$.

Thus, the least significant bit of log(r) is a displacement in the radial direction that is slightly greater than the displacement of one least significant bit of theta in the tangential direction. Using base-2, the least significant bit of log(r) is reduced by $\log_e(2)=0.69$ to $5.54\times 2^{-15}$, which is slightly less than the least significant bit of $\theta$. If important, exactly equal radial and tangential quantization is a achievable with a special base between 2 and e of $e^{\pi/4}=2.19328$. However, base-2 has implementation advantages and is preferred. For example, using base-2, the logmagnitude of format 5.12 represents signal levels ranging over 32×6=192 dB dynamic range, which is double the range of the 16-bit format. Moreover the quantizing noise is more than 80 dB below the signal level, for all signal levels. This is more than adequate for radio signal processing in normal applications, and may be useful for simulation when it is desired to ensure that quantizing effects are negligible, or for critical applications such as interference cancellation with extreme differences between large unwanted and small wanted signals.

When two logpolar values are log-added or log-subtracted, the result is the value having the larger logmagnitude if the difference in their logmagnitudes is so great that the least significant bits of log(r) or θ will not be affected. Therefore, if $R_1$ and $R_2$ are the logmagnitudes of two logpolar values $Z_1$ and $Z_2$, and R is the difference between $R_1$ and $R_2$, always positive, then the function $$\log_e(1+e^{-Z}) = \log_e(1+e^{-(R+j\theta)})$$

is zero to 12 binary places when R is greater than $13 \log_e(2) = 9.011$.

Thus only values of the difference in logmagnitudes R between 0 and 9 need be considered in the base-e case for 32-bit logpolar format. Similarly, in the base-2 case, only values of the logmagnitude difference that lie between 0 and 13 need be considered as an argument of the complex logadd/sub function. Thus 4-bits to the left of the binary point suffices for representing R, making R of the form 4.12.

Because the complex logadd/logsub function for negative θ is the conjugate of that for positive θ, θ may be limited to the range 0 to just less than π, and is thus of the form 0.0xxxxxxxxxxxxxx, having only 14 variable bits. During the research leading to this invention, convergence problems with the complex iteration were found to be largely solved by excluding the special value of π=0.10000000000 ... for the angular difference. This value is exactly equivalent to real subtraction of the logmagnitudes, the angle of the result being one of the two input argument angles, and is best performed by using the $F_s$ function for real arithmetic.

The iterative process for complex numbers, as for real numbers, first comprises splitting the difference Z=(θ, R)=$Z_1-Z_2$ of the two arguments to be combined, $Z_1$ and $Z_2$, into most significant and least significant parts. As explained above, the value of Z really only needs 30 variable bits. For example, let $Z_M$ be the most significant 7 bits of the 14 variable bits of θ and the most significant 8 bits of the 16 bit R, i.e., $Z_M$=(0.0xxxxxxx; xxxx.xxxx) in phase-first notation.

Then $Z_L$ is the remaining least significant 8 bits of R and the 7 least significant bits of θ, in the format $Z_L$= (0.00000000xxxxxxx; 0000.0000xxxxxxxx). Then define $Z_M^+ = Z_M + dZ$, where dZ has a real part of 0.0001 or 0.000011111111 and an imaginary part of 0 or 0.111111111111111, i.e., 1 LSB less than 2π. Then $Z_L^-$ is defined as $Z_M^+ - Z$. With the former choice for dZ, $Z_L^-$ is the two's complement of the variable bits of $Z_L$, while for the latter choice for dZ it will be the complement of those bits. Because the complement is easier to form than the two's complement, the latter choice for the real and imaginary parts of dZ is preferred. Then, $$\log_e(1+e^{-Z}) = \log_e\left(1+e^{-Z_M^+}-e^{-Z_M^+}+e^{-Z}\right) \quad (34)$$
$$= \log_e\left(1+e^{-Z_M^+}\right) + \log_e\left(1+e^{-Z'}\right),$$

where $Z' = Z + \log_e\left(1+e^{-Z_M^+}\right) - \log_e\left(1-e^{-Z_L^-}\right).$ The function $\log_e(1-e^{-Z_M^+})$ depends only on the 8 most significant bits of R and the 7 most significant bits of θ, and therefore may be pre-calculated and stored in a 32,768-word table directly addressed by $Z_M$. Thus, it is unnecessary to form $Z_M^+$ during processing.

The function $-\log_e(1-e^{-Z_L^-})$ depends only on the 7 LSBs of R and the 8 LSBs of θ and can also be pre-computed and stored as a 32,768-word look-up table, the G-function for complex arithmetic. The latter is only needed for computing the succession of values Z', Z'', Z''', etc., while the desired result is the sum of the original argument with the larger logmagnitude, $Z_1$ or $Z_2$, and the succession of F-function values with arguments $Z_M$, Z'M, Z''M, etc. Research showed that up to 6 iterations could be necessary for the complex logadd/logsub iteration to converge, the worse case being when the angles of $Z_1$ and $Z_2$ are nearly 180 degrees apart and their magnitudes are nearly equal. The case of exactly 180 degree apart angles is, as mentioned above, handled by treating the operation as real subtraction.

To accommodate both real and complex operations in the same F-table, two extra address bits may be provided to select the table for real addition, the table for real subtraction, and the table for complex addition/subtraction. The function may be denoted by $F(r_m, \text{opcode})$ where $r_M$ is 14 of the 15 bits of the argument for the complex case and the $15^{th}$ bit is part of the 2-bit opcode. The two-bit opcode is thus allocated as shown in the table below:

| | |
|---|---|
| 00 | Real addition |
| 01 | Real subtraction |
| 1x | Complex addition/subtraction, where x is the $15^{th}$ bit of the main argument |

Likewise, the function $\log_e(1-e^{-Z_L^-})$ depends only on the 15 bits of $Z_L$, and so may be pre-calculated and stored in a look-up table to be directly addressed by $Z_L^-$. It equates in size and function to the G-table for real operations, and can be combined with the real G-table in a 65,536-word look-up table by introducing an "opcode" argument that is 0 for real and 1 for complex to select the appropriate 32,768-word half.

By dividing the complex input into most significant and least significant portions, the same principles used to perform logarithmic arithmetic on real numbers using a two-table iterative process may also be applied to complex numbers represented in a logarithmic format. In addition, by dividing the complex input into most significant and least significant portions, the multi-stage pipeline described in co-pending U.S. patent application Ser. No. 11/142,485 entitled "Pipelined Real or Complex ALU" may be applied to complex numbers represented in a logpolar format. This co-pending application is incorporated herein by reference. In the pipeline of the co-pending application, the ALU stores a selected portion of a look-up table for each stage of the pipeline. At least one stage of the pipeline executes the selected portion of the look-up table using a stage input represented in a logpolar format to generate a partial output associated with the stage. By combining the partial outputs, the multi-stage pipeline generates the logarithmic output.

When θ=π, it can be seen that the operation is equivalent to real subtraction. The result in this case depends only on R, for which a special look-up table may be used in a one-shot operation. Alternatively, the existing look-up table for real subtraction may be used. This may be done by performing the real subtraction algorithm using the 14 bits 0xxxx.xxxxxxxxx of R to address the $F_s$, part of the F-table and the remaining three bits of R extended with 12 zeros to be the initial value of $R_L$. The real iteration is then performed apart from accumulating only the desired bits of precision in the output register corresponding to the reduced complex precision, and use of an earlier termination criterion than R>18. For example R>9 could suffice.

Common ALU for Real and Complex Logarithmic Arithmetic

Complex and real numbers may be used to represent various signals within a single system. As such, conventional processors may include separate ALUs—one for implementing complex logarithmic arithmetic and one for implementing real logarithmic arithmetic. However, two separate ALUs take up considerable silicon space. Further, in some instances, such ALUs may require prohibitively large look-up tables. Therefore, it would be beneficial to have a single ALU that implements both real and complex logarithmic arithmetic with reasonably sized look-up tables.

Figure 8:
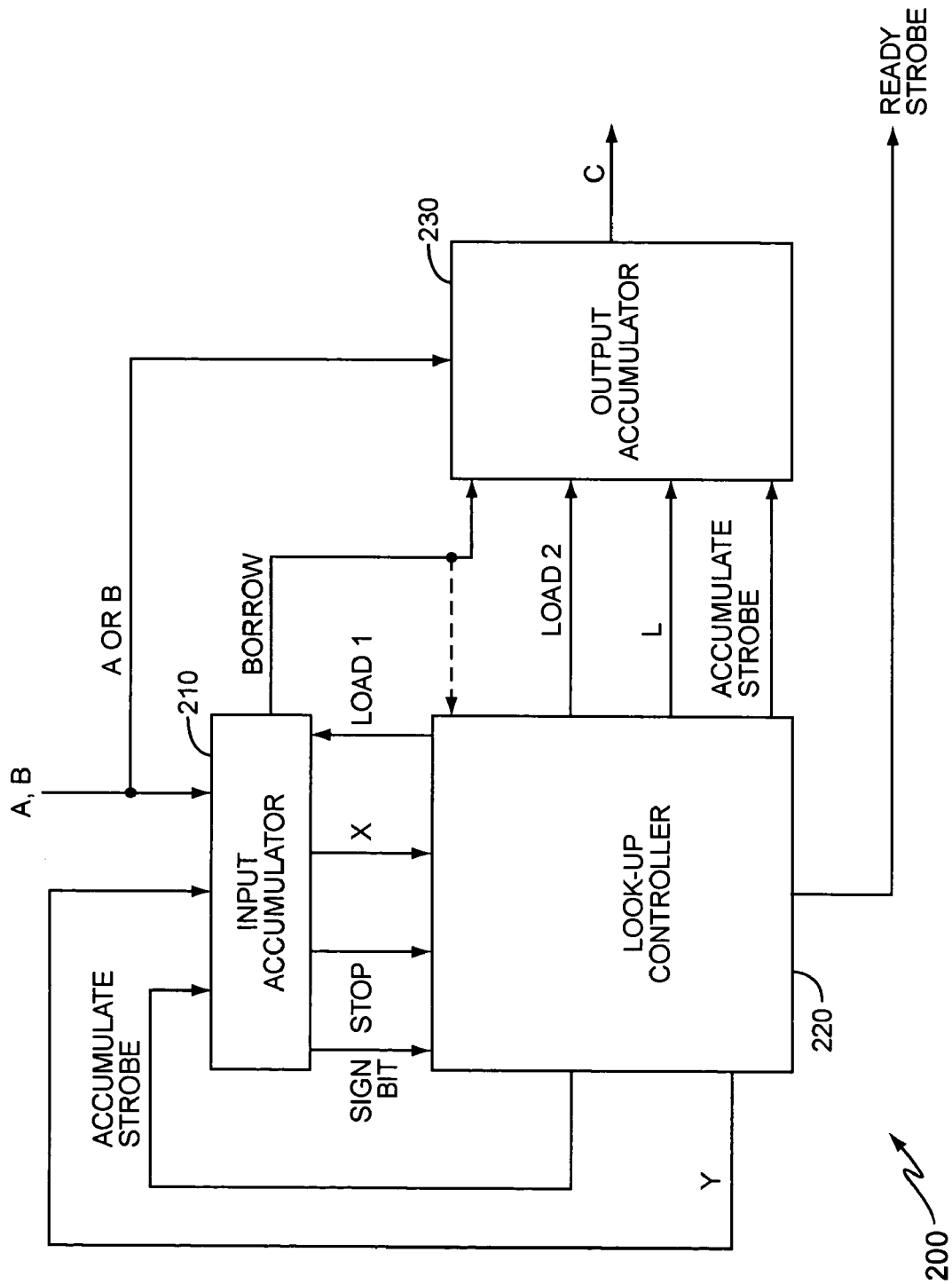
FIG. 8 illustrates a block diagram of an exemplary ALU according to the present invention.

FIG. 8 illustrates one exemplary ALU 200 for performing both real and complex logarithmic arithmetic. ALU 200 includes input accumulator 210, look-up controller 220, and output accumulator 230. Generally, input accumulator 210 computes a difference between two real or complex inputs, while look-up controller 220 and output accumulator 230 collectively generate an output logarithm based on the real or complex output of input accumulator 210 using a real look-up table or a complex look-up table depending on the input.

Two real or complex numbers A and B represented in a logarithmic format to be added or subtracted are presented in succession to input accumulator 210. On the first occurrence of a strobe pulse, ALU 200 loads the first number A into input accumulator 210 and output accumulator 230. The second number, B, with its angular part θ or associated sign changed 180 degrees for subtraction, is then presented to the input accumulator 210.

On the second occurrence of the strobe, input accumulator 210 subtracts B from A. If there is an underflow indicating that the logmagnitude of B was greater than the logmagnitude of A, input accumulator 210 stores and outputs a value X=B−A, and sends a borrow pulse to output accumulator 230. The borrow pulse causes output accumulator 230 to load B, inclusive of its associated modified or unmodified sign (or angle, in the complex case), overwriting A. However, if there is not an underflow, input accumulator stores and outputs a value X=A−B. Thus, output accumulator 230 holds the larger of A and B, while input accumulator 230 holds |A−B|. The quantity X equates to the quantity r in the foregoing equations for real numbers, and equates to the quantity Z in the foregoing equations for complex numbers.

Based on X, look-up controller 220 determines two outputs, partial output L and correction output Y. Look-up controller 220 outputs partial output L to output accumulator 230 along with an ADD pulse, causing the accumulation of partial output L with the existing contents of output accumulator 230. Look-up controller 230 outputs correction output Y to input accumulator 210 along with an ADD pulse causing the accumulation of Y with the existing contents of input accumulator 210, thus creating a new value of X. The cycle repeats until Y meets or exceeds a predetermined value. Once Y meets or exceeds the predetermined value, the cycle stops, look-up controller 220 generates a READY signal indicating that the desired answer is available from output accumulator 230 as the output C, and the state of the ALU 200 returns to the initial state, where it waits for a new pair of A and B input values.

Figure 9:
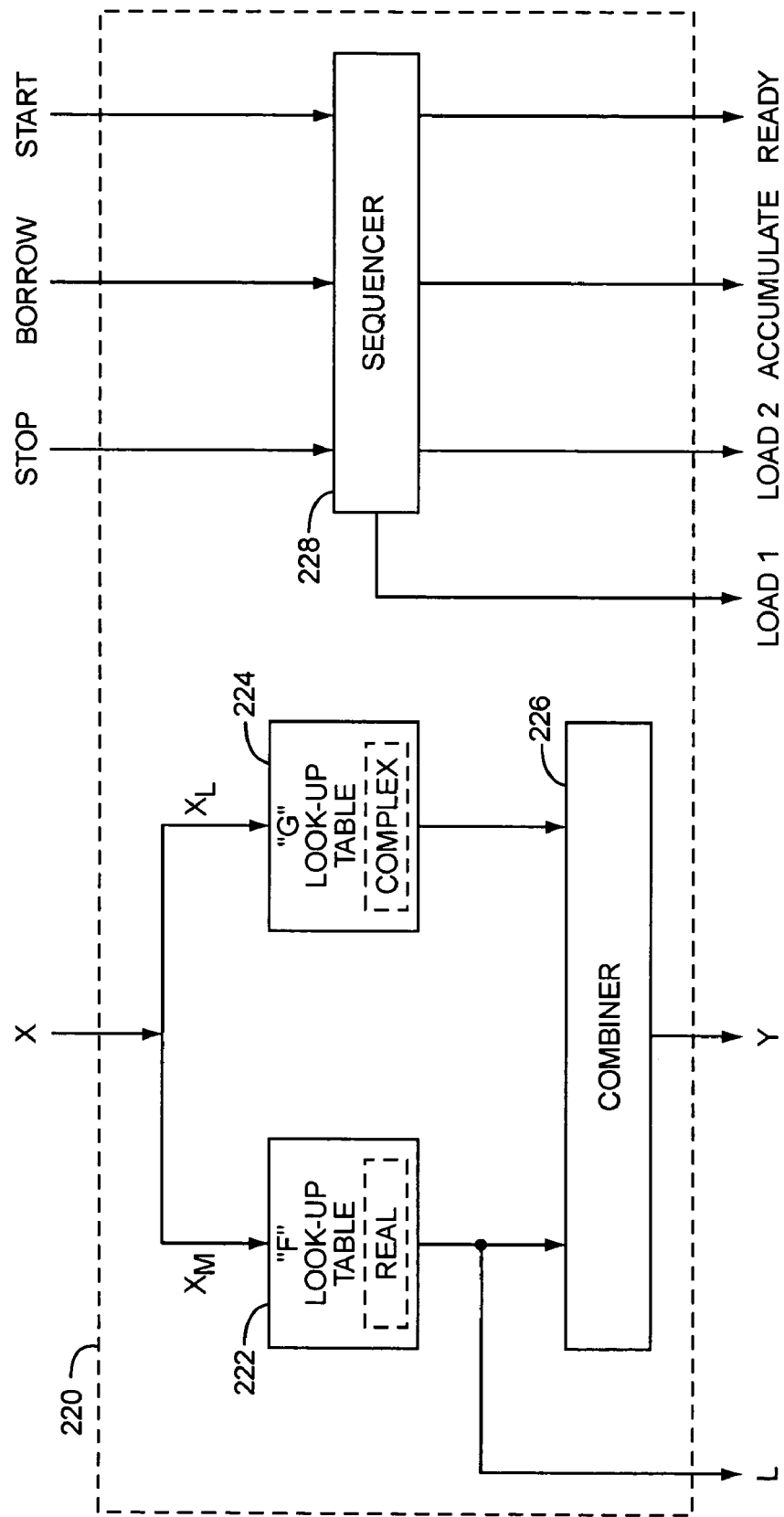
FIG. 9 illustrates a block diagram of an exemplary look-up controller for the ALU of FIG. 8.

FIG. 9 provides additional details of one exemplary look-up controller 220 for real or complex logarithmic arithmetic operations. Look-up controller 220 includes an F-table 222, a G-table 224, combiner 226, and sequencer 228. F-table 222 and G-table 224 include a complex look-up table for determining the logarithms of complex numbers and/or a real look-up table for determining the logarithms of real numbers. While the F-table 222 and G-table 224 illustrated in FIG. 9 include both complex and real look-up tables, those skilled in the art will appreciate that F-table 222 and/or G-table 224 may include only one of the complex and real look-up tables.

The start strobe is applied to sequencer 228 as the first 32-bit logarithmic quantity A is applied to accumulators 210 and 230. Sequencer 228 provides a load 1 pulse to input accumulator 210 and a load 2 pulse to output accumulator 230, causing them to store the 32-bit A-quantity. A second strobe is applied to sequencer 228 as the second 32-bit logarithmic quantity B is applied to the accumulators 210, 230.

Sequencer 228 provides an accumulate pulse to input accumulator 210. If input accumulator 210 outputs a "borrow" pulse, indicating that the logmagnitude of B was greater than the logmagnitude of A, sequencer 228 outputs another load 2 pulse to output accumulator 230, causing it to store the B value including the sign or phase of the number B in output accumulator 230, overwriting A. For real numbers, the sign of the value with the larger logmagnitude becomes the sign of the result C. Input accumulator 210 outputs the value of the difference X between the logmagnitudes, where X=A−B if A is larger or X=B−A if B is larger, so X is always positive. The most significant part of X, $X_M$, is applied to the F look-up table 222, while the least significant part of X, $X_L$, is applied to the G look-up table 224.

For real numbers, the sign logic part of input accumulator 210 XOR's the signs of the numbers A and B to determine whether the $F_a$ part of look-up table 222 should be used (same signs imply addition) or whether $F_s$ should be used (different signs imply subtraction). The XOR of the signs thus forms an extra address bit to the F table 222.

If the value X in input accumulator 210 does not exceed the stop threshold, no stop pulse is provided to sequencer 228 and the sequencer then continues by sending an accumulate pulse to input and output accumulators 210, 230, causing accumulation of the value F+G from combiner 226 to input accumulator 210, the accumulation of the partial output L in output accumulator 230, and the accumulation of the correction output with the contents of the input accumulator 210.

This repeats until output accumulator 230 indicates that its contents meet or exceed the stop threshold in value by providing a "stop" pulse to sequencer 228, upon which sequencer 228 generates the "ready" pulse indicating that the value C in output accumulator 230 is the final result, and returns itself to the starting state.

In the arrangement of FIG. 9, the $F_s$ part of the look-up table 222 stores a negative value that is appropriately accumulated in accumulators 210 and 230 without needing to indicate separately whether a logaddition or logsubtraction operation is in progress. Otherwise, in order to save storing the sign bit of all $F_s$, it may be omitted from the look-up table and the value of the +/− bit supplied from the sign logic may be used, as all $F_a$ values are positive and all $F_s$ values are negative. Storing the true negative value of $F_s$ less the sign bit is different than negating the value and storing a positive value, which would then have to be subtracted from output accumulator 230 and combiner 226. When look-up table size compression is considered, it will be seen that the latter has advantages. Look-up table compression is discussed further in U.S. patent application Ser. No. 11/143,157 entitled "Memory Compression." which is incorporated herein by reference.

Other variations that may be considered during implementation include causing the output value Y of combiner 226 to be the negative of F+G so that it can be subtracted from input accumulator 210, thus obviating the need to make input accumulator 210 differentiate between add and subtract commands. Because the negative is the complement plus 1, this can be done by using the complementary outputs, while storing the G-table 224 values that are all reduced by one least significant bit. However, it is preferred that the values of G-table 224 not be so modified, in order that the G table 224 may be generally useful for other scenarios.

Figure 10:
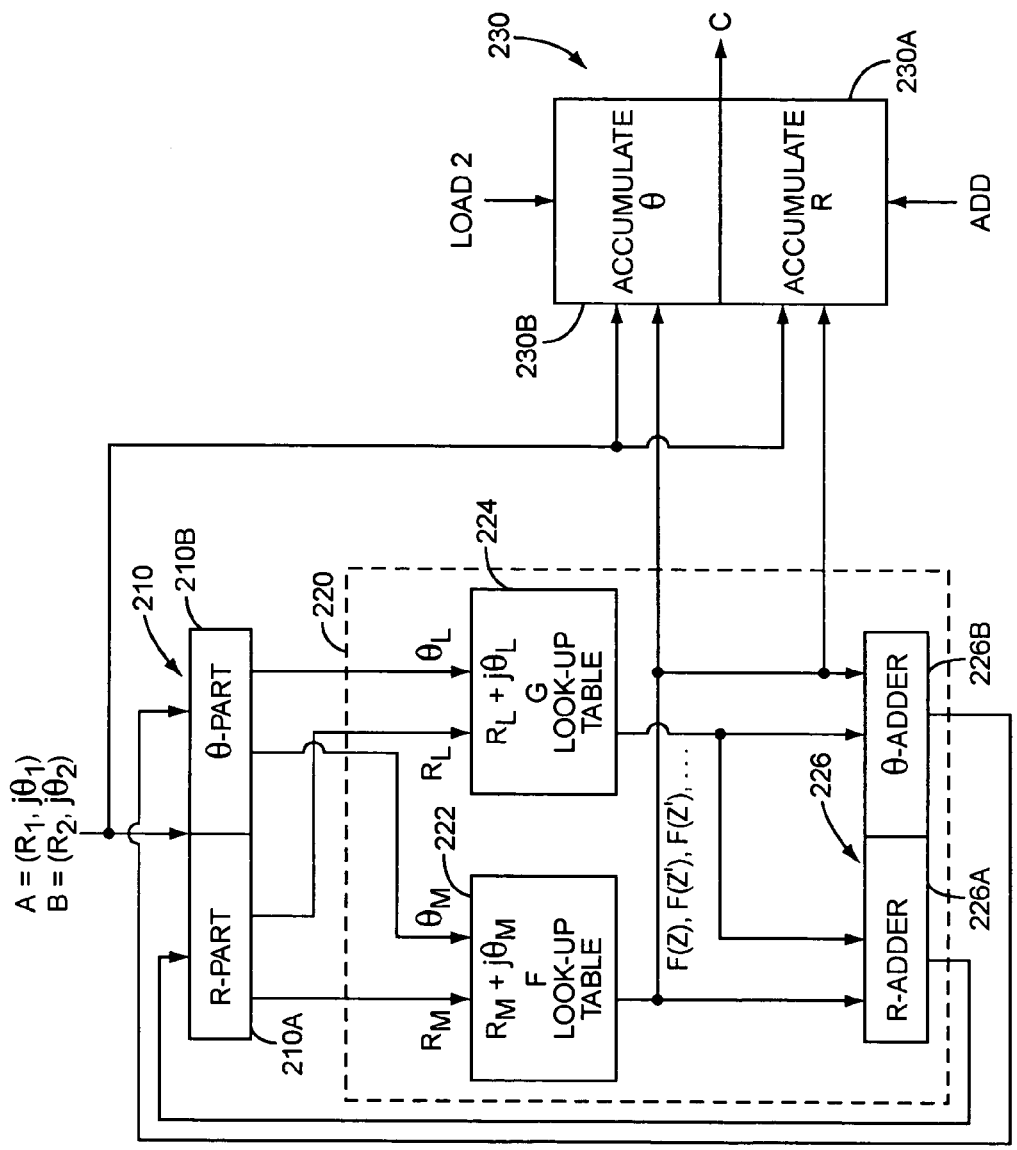
FIG. 10 illustrates additional details of an exemplary ALU according to the present invention.

FIG. 10 shows more details of complex operation in ALU 200. For complex values, the input accumulator 210 comprises two independent parts, an R-part 210A and a θ-part 210B. The same input accumulator 210 as is used for real arithmetic may be used for complex arithmetic if the carry output from the θ-part 210B of the input accumulator is prevented from propagating into the R-part 210A, or vice versa in the case of θ-first bit order.

Of significance is that the bits that address the complex F-table 222 come partly from θ and partly from R. If θ occupies the position occupied by the LSBs of R in the real-number case, then the connections between the input accumulator and the F-table 222 must be changed for complex operation. This is also true for the G-table 224. This is a minor inconvenience that can be implemented with a set of selector switches (not shown) that select the appropriate bits from the input accumulator 210 to connect to the address inputs of the G and F-tables independently for real and complex operation. An alternative solution may also be considered: the connections between the input accumulator 210 and the F and G tables may be kept the same for real and complex operation, which requires interleaving the allocation of bits to R and θ. Thus, the most significant bits of θ would swap places with the least significant bits of R in this implementation, so that the most significant bits of R and θ would occupy the bit positions occupied by the most significant bits of R in the real case, and the least significant bits of R and θ would occupy the bit positions occupied by the least significant bits of R in the real case. To keep the R-bits connected such as to form an R-adder 226A and the θ bits likewise to form an independent θ-adder 226B then requires that the carry bits of three adder stages be re-routed for complex as compared to real. If this is done, then to avoid crossing of connections from real to complex, the output accumulator 230 and adder 226 is configured likewise. This will also ensure that the output bits of the F and G-table remain connected to the same destinations in adder 226 and accumulator 230.

The alternative just described above is less practical when it is desired to use the real subtraction table $F_s$ for the complex case when θ=π. In that case, it is desired that all the bits of R connect to the address input of the F-table 222 and likewise all its output bits connect to the R-adder parts of accumulator 230 and adder 226. In that case, it is difficult to avoid the use of re-routing switches. If the θ=π case is handled without an iteration, i.e. by a single look-up in the real $F_s$-table 222, then the re-routing of adder bits is avoided.

Another bit-alignment issue to be dealt with in using the real subtraction table for the complex θ=π case is that the number of bits of R to the left of the binary point is one less (4 bits) for complex numbers than for real numbers (5 bits). In addition, the real iteration uses an F-table 222 addressed by most significant bits in the form 5.9 for example, while to handle the θ=π case for complex without an iteration would require addressing the F-table 222 with the whole 16 bits of the difference value R in the format 4.12, which requires a different sized table.

Figure 11A:
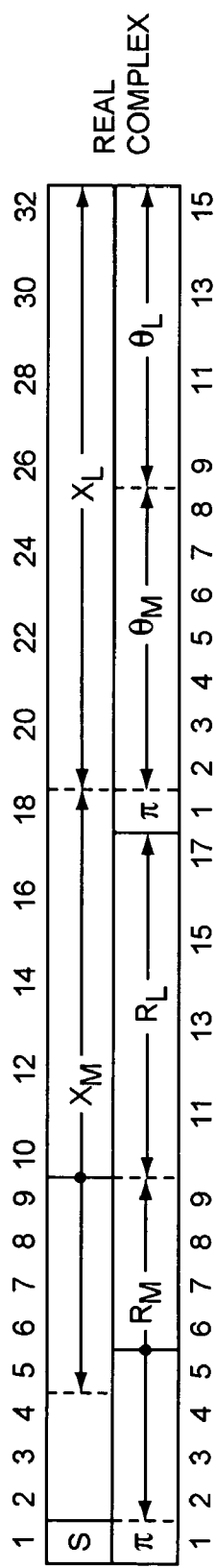
FIGS. 11A-11C illustrate different allocations for complex numbers relative to real numbers.

FIG. 11 shows different possible bit allocation for real and complex numbers. FIG. 11A shows a straightforward allocation of bits 1 to 32 to a real logarithmic value starting with the sign bit S in position 1 followed by a 31 bit logmagnitude in format 8.23 and showing the split into most significant part $X_M$ of format 5.9 and least significant part $X_L$ in format 0.14. Underneath is shown a straightforward allocation of bits 1-32 to a logamplitude in format 5.12 and a phase angle in format 0.15, and the division of the logamplitude into a most significant part $R_M$ in format 4.4 and a least significant 8-bit $R_L$, while the phase is divided into 7-bit most and least significant parts with the bit corresponding to π shown separately. A number of misalignments between real and complex are evident from FIG. 11A. For example, the binary point of the logmagnitude is not in the same place, and the bits which address the F-table 222, $X_M$ for real but $R_M$, $\theta_M$ for complex, are not the same bits.

Figure 11B:
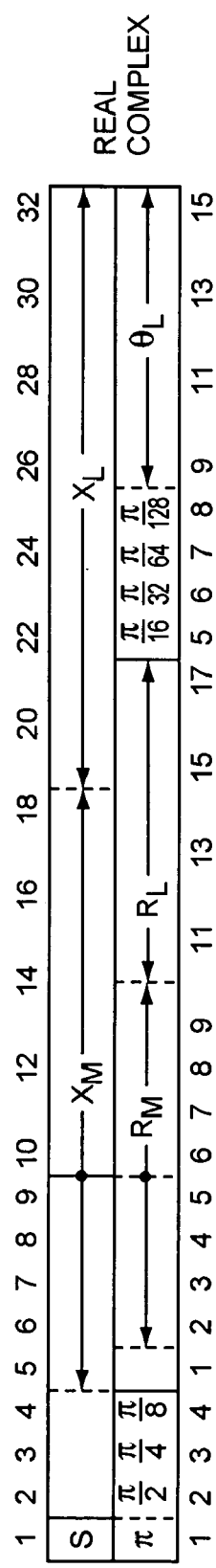

FIG. 11B shows a bit allocation in which the binary points are aligned for the real and complex logmagnitudes respectively. This is only of interest if attempting to re-use the real $F_s$-table 222 for the complex case of θ=π and the real $F_a$-table 222 for the complex case of θ=0. The bits that address the F and G tables are however still different for real and complex.

Figure 11C:
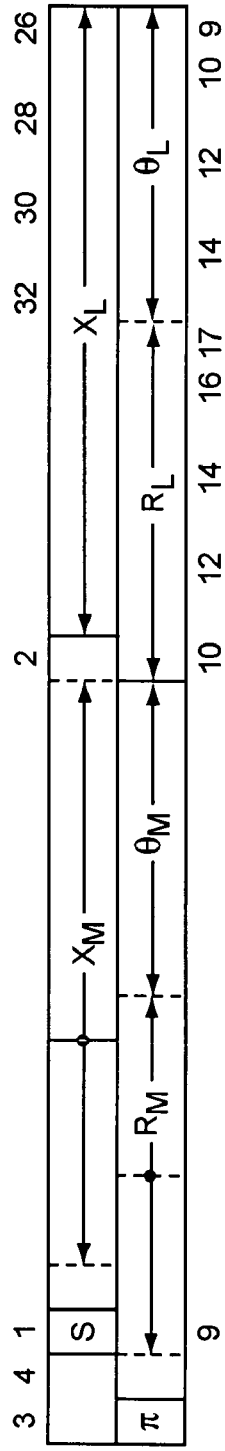

FIG. 11C shows a bit allocation that achieves the same bits addressing the F-table 222 for both real and complex. The sign bit S and the most significant part $X_M$ are placed contiguously to address the $F_a$ and G tables for real arithmetic, making a 15-bit address altogether, and the same 15-bits in the complex case comprise the 8-bit $R_M$ and 7-bit $\theta_M$.

Likewise the 15 bits comprised of $R_L$ and $\theta_L$ overlap the 14 bits of $X_L$, which address the G-table 224 ROM. In the real case, the bit number 2 is just ignored when addressing the G-table 224 in real, as it is half the size of the complex table. FIG. 11C also shows that the bit order within the most significant and least significant parts is arbitrary but can be chosen to maximize the number of carry connections from one adder stage to the next in significance that remain unchanged between real and complex operation.

A simple solution is not to attempt to combine the complex and real F-table 222 into one large table, which would therefore have to use the same address bits in both cases, but to use separate tables that are connected to the appropriate address bits, selected from input accumulator 210 differently for the real and complex cases. Alternatively, separate address-decoders can be used for real and complex. Likewise the G-tables 224 for real and complex can be different tables or at least different address decoders. The total size remains about the same as for combined tables apart from further consideration of the θ=π case. The θ=π case is only problematic when the logamplitudes are nearly equal, i.e., R is nearly zero. Therefore it need be handled as a special case only for R values such as 0000.xxxxxxxxxxxx or 0.12, i.e. the case where the most significant 4 bits of the difference R are zero. This requires only a 4096-word table, which may be worth it to avoid the complexities of bit line re-routing in order to be able to use the real $F_s$-table 222. Given that the look-up tables occupy the greatest proportion of the silicon chip area and that the chip area occupied by accumulators, adders, and other peripheral logic is small in comparison, a conclusion may be that separate implementations of the real and complex algorithms is logical, with the benefit that the resulting processor can then perform real and complex operations simultaneously for increased processing speed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An ALU for computing output logarithms comprising:
    memory storing a first look-up table for determining logarithms of real numbers, and a second look-up table for determining logarithms of complex numbers, wherein the second look-up table is separate from the first look-up table; and
    a shared processor to generate an output logarithm based on two input operands represented in a logarithmic format using the first look-up table for real input operands and the second look-up table for complex input operands.

2. The ALU of claim 1 wherein the output logarithm represents the logarithm of the sum or difference of the input operands.

3. The ALU of claim 1 wherein the ALU comprises a butterfly circuit configured to simultaneously generate the logarithm of a difference between the input operands and the logarithm of a sum of the input operands using the first look-up table or the second look-up table.

4. The ALU of claim 3 wherein the butterfly circuit comprises:
    a first combiner to combine a selected input operand with a difference value provided by the first or second look-up tables to generate the logarithm of the difference between the input operands; and
    a second combiner to combine the selected input operand with a sum value provided by the first or second look-up tables to generate the logarithm of the sum of the input operands.

5. The ALU of claim 1 wherein the shared processor comprises:
    a look-up controller configured to compute one or more partial outputs based on the first or second look-up tables; and
    an output accumulator configured to generate the output logarithm based on the partial outputs.

6. The ALU of claim 5 wherein the number of partial outputs used to generate the output logarithm is based on a desired accuracy of the output logarithm.

7. The ALU of claim 5 wherein the shared processor executes two or more iterations through the look-up controller to determine the output logarithm, wherein each iteration generates one of the partial outputs.

8. The ALU of claim 7 further comprising an input accumulator configured to generate a real or complex input for a current iteration based on the partial output generated during a previous iteration.

9. The ALU of claim 7 wherein the output accumulator generates the output logarithm based on a selected input operand and the partial outputs generated during each iteration.

10. The ALU of claim 9 wherein the shared processor further comprises a selection circuit configured to select the input operand with the greatest magnitude.

11. The ALU of claim 5 wherein the look-up controller comprises a multi-stage pipeline, and wherein each stage of the multi-stage pipeline generates one of the partial outputs.

12. The ALU of claim 11 wherein each stage of the pipeline stores a selected portion of the first and second look-up tables.

13. The ALU of claim 12 wherein at least one stage of the pipeline executes the selected portion of the first look-up table using a real stage input or executes the selected portion of the second look-up table using a complex stage input to generate one of the partial outputs.

14. The ALU of claim 1 wherein the complex input operands each comprise a magnitude portion and a phase portion.

15. The ALU of claim 14 further comprising an input accumulator comprising:
    a magnitude accumulator to generate a magnitude portion of a complex input based on magnitude portions of the complex input operands; and
    a phase accumulator to generate a phase portion of the complex input based on phase portions of the complex input operands.

16. A method for computing output logarithms in an ALU comprising:
    storing a first look-up table for determining logarithms of real numbers;
    storing a second look-up table for determining logarithms of complex numbers, wherein the second look-up table is separate from the first look-up table; and
    generating an output logarithm based on two input operands represented in a logarithmic format in a shared processor using the first look-up table for real input operands and the second look-up table for complex input operands.

17. The method of claim 16 wherein generating the output logarithm based on two input operands comprises generating the output logarithm based on a sum or difference of the input operands.

18. The method of claim 16 wherein generating the output logarithm based on two input operands comprises simultaneously generating the output logarithm of a difference between the input operands and generating the output logarithm of a sum of the input operands using the first or second look-up tables.

19. The method of claim 18 wherein simultaneously generating the output logarithms comprises:
    selecting an input operand based on a comparison between the input operands;
    combining the selected input operand with a difference value provided by the first or second look-up tables to generate the output logarithm of the difference between the input operands; and
    combining the selected operand with a sum value provided by the first or second look-up tables to generate the output logarithm of the sum of the input operands.

20. The method of claim 16 wherein generating an output logarithm based on two input operands comprises:
    computing one or more partial outputs based on the first or second look-up tables; and
    generating the output logarithm based on the partial outputs.

21. The method of claim 20 further comprising executing two or more iterations to determine the output logarithm, wherein each iteration generates one of the partial outputs.

22. The method of claim 21 further comprising generating an input for a current iteration based on the partial output generated during a previous iteration.

23. The method of claim 20 wherein generating the output logarithm based on the partial outputs comprises generating the output logarithm based on the partial outputs generated in each stage of a multi-stage pipeline.

24. The method of claim 23 further comprising storing a selected portion of the first and second look-up tables for each stage of the multi-stage pipeline.

25. The method of claim 24 further comprising, in at least one stage of the pipeline, executing the selected portion of the first or second look-up tables based on a real or complex stage input, respectively, to generate one of the partial outputs.

26. The method of claim 16 wherein the complex input operands each comprise a magnitude portion and a phase portion.

27. The method of claim 26 further comprising:
generating a magnitude portion of a complex input based on the magnitude portions of the complex input operands; and
generating a phase portion of the complex input based on the phase portions of the complex input operands.

28. An ALU for computing output logarithms of complex numbers comprising:
memory storing a look-up table for determining logarithms of complex numbers; and
a processor to generate an output logarithm of an arithmetic combination of complex input operands represented in a logpolar format using the stored look-up table, wherein the processor comprises:
a butterfly circuit configured to simultaneously compute the output logarithm of a difference between the complex input operands and the output logarithm of a sum of the complex input operands based on the look-up table.

29. The ALU of claim 28 wherein the butterfly circuit comprises:
a first combiner to combine a selected input operand with a difference value provided by the look-up table to generate the output logarithm of the difference between the complex input operands; and
a second combiner to combine the selected input operand with a sum value provided by the look-up table to generate the output logarithm of the sum of the complex input operands.

30. The ALU of claim 28 wherein the processor comprises:
a look-up controller configured to compute one or more partial outputs based on the look-up table; and
an output accumulator configured to generate the output logarithm based on the partial outputs.

31. The ALU of claim 30 wherein the processor executes two or more iterations through the look-up controller to generate the output logarithm, wherein each iteration generates one of the partial outputs.

32. The ALU of claim 31 further comprising an input accumulator configured to generate a complex input for a current iteration based on the partial output generated during a previous iteration.

33. The ALU of claim 30 wherein the look-up controller comprises a multi-stage pipeline, and wherein each stage of the multi-stage pipeline generates one of the partial outputs.

34. The ALU of claim 28 wherein the complex input operands comprise a magnitude portion and a phase portion.

35. The ALU of claim 34 further comprising an input accumulator comprising:
a magnitude accumulator to generate a magnitude portion of a complex input based on magnitude portions of the complex input operands; and
a phase accumulator to generate a phase portion of the complex input based on phase portions of the complex input operands.

36. The ALU of claim 34 wherein the phase portion comprises a most significant portion of the complex input, and wherein the magnitude portion comprises a least significant portion of the complex input.

37. The ALU of claim 36 wherein the look-up table comprises a magnitude look-up table and a phase look-up table.

38. The ALU of claim 37 wherein the most significant portion of the complex input addresses the phase look-up table and wherein the least significant portion of the complex input addresses the magnitude look-up table.

39. A method computing output logarithms of complex numbers in an ALU, the method comprising:
storing a look-up table for determining logarithms of complex numbers represented in a log polar format;
generating an output logarithm based on complex input operands represented in the logpolar format in a processor using the stored look-up table by:
simultaneously computing the output logarithm of a difference between the complex input operands and the output logarithm of a sum of the complex input operands based on the look-up table.

40. The method of claim 39 wherein generating the output logarithm comprises:
computing one or more partial outputs based on the look-up table; and
generating the output logarithm based on the partial outputs.

41. The method of claim 40 further comprising executing two or more iterations to generate the output logarithm, wherein each iteration generates one of the partial outputs.

42. The method of claim 41 wherein generating the output logarithm comprises executing a multi-stage pipeline to generate the output logarithm, wherein each stage of the multi-stage pipeline generates one of the partial outputs.

43. The method of claim 39 further comprising:
generating a magnitude portion of a complex input based on magnitude portions of the complex input operands; and
generating a phase portion of the complex input based on phase portions of the complex input operands.

44. The method of claim 43 wherein the phase portion comprises a most significant portion of the complex input, and wherein the magnitude portion comprises a least significant portion of the complex input.

45. The method of claim 44 wherein the look-up table comprises a magnitude look-up table and a phase look-up table.

46. The method of claim 45 further comprising addressing the phase look-up table using the most significant portion of the complex input and addressing the magnitude look-up table using the least significant portion of the complex input.

* * * * *